Jan. 25, 1966    D. A. FREEMAN    3,231,157
FOLDING DEVICE

Filed Feb. 10, 1961    16 Sheets-Sheet 3

Inventor,
David A. Freeman
By Schneider, Dressler, Goldsmith & Clement, Attys.

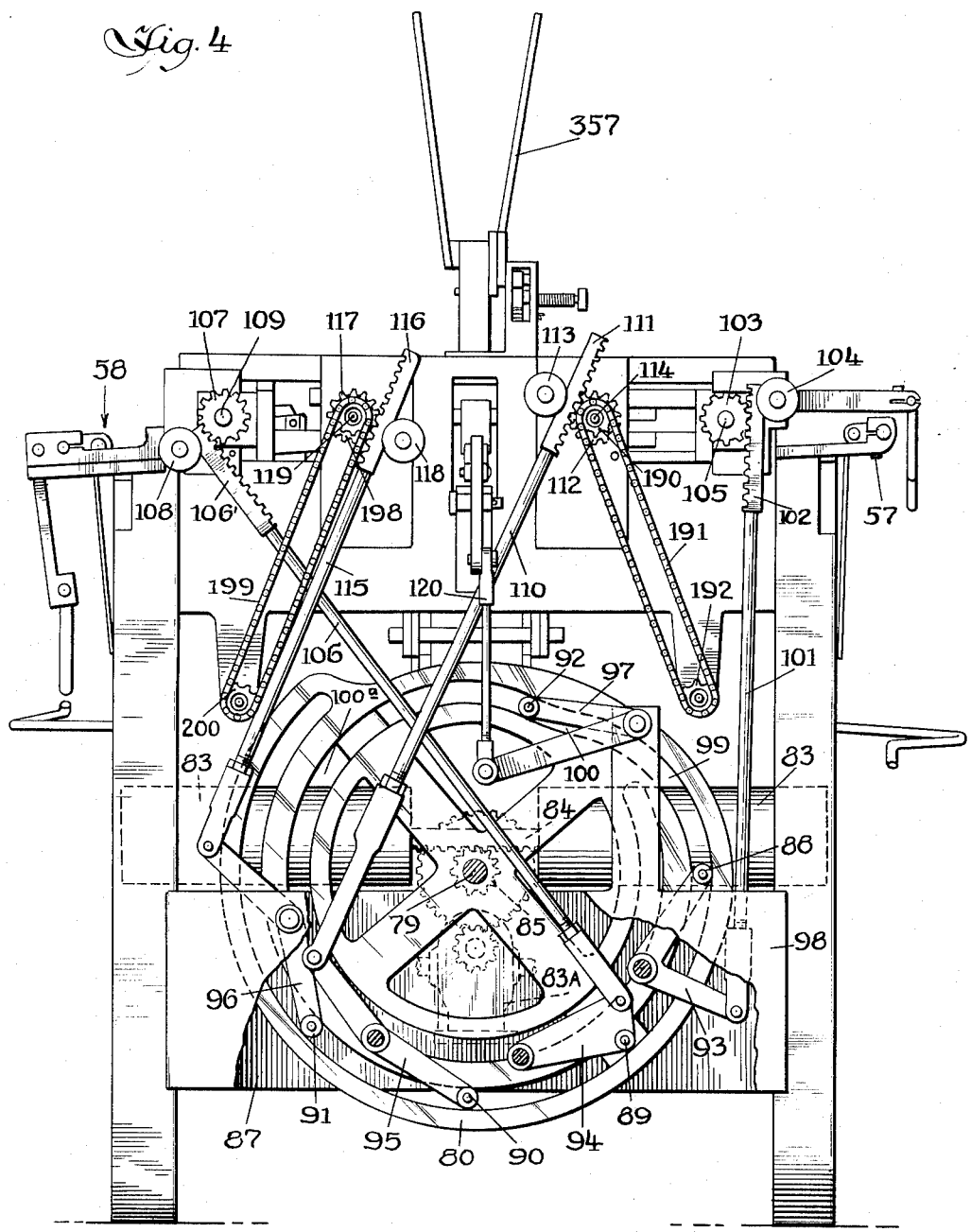

Jan. 25, 1966 D. A. FREEMAN 3,231,157
FOLDING DEVICE
Filed Feb. 10, 1961 16 Sheets-Sheet 5
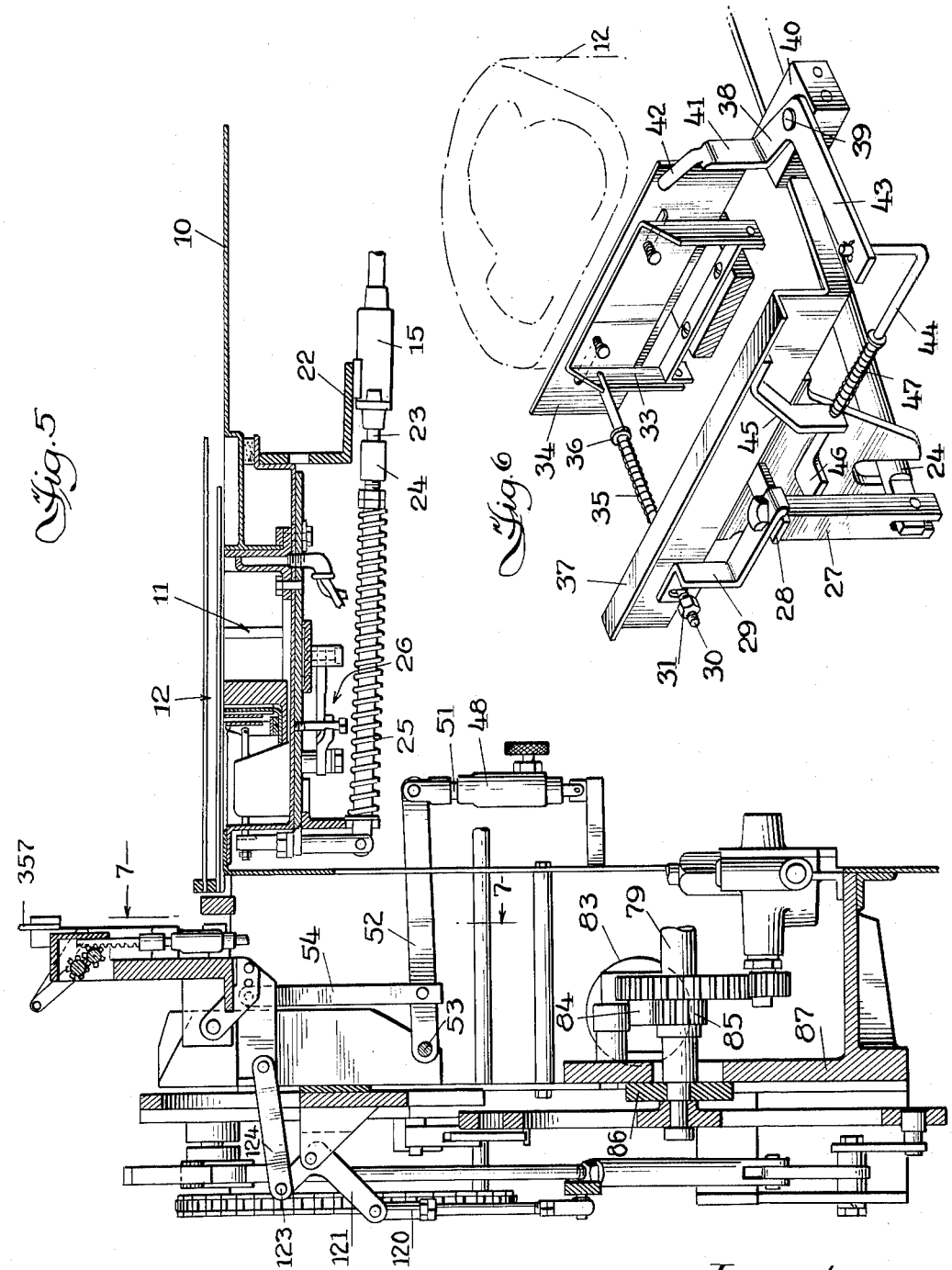
Inventor,
David A. Freeman,
By: Schneider, Dressler, Goldsmith & Clement, Attys.

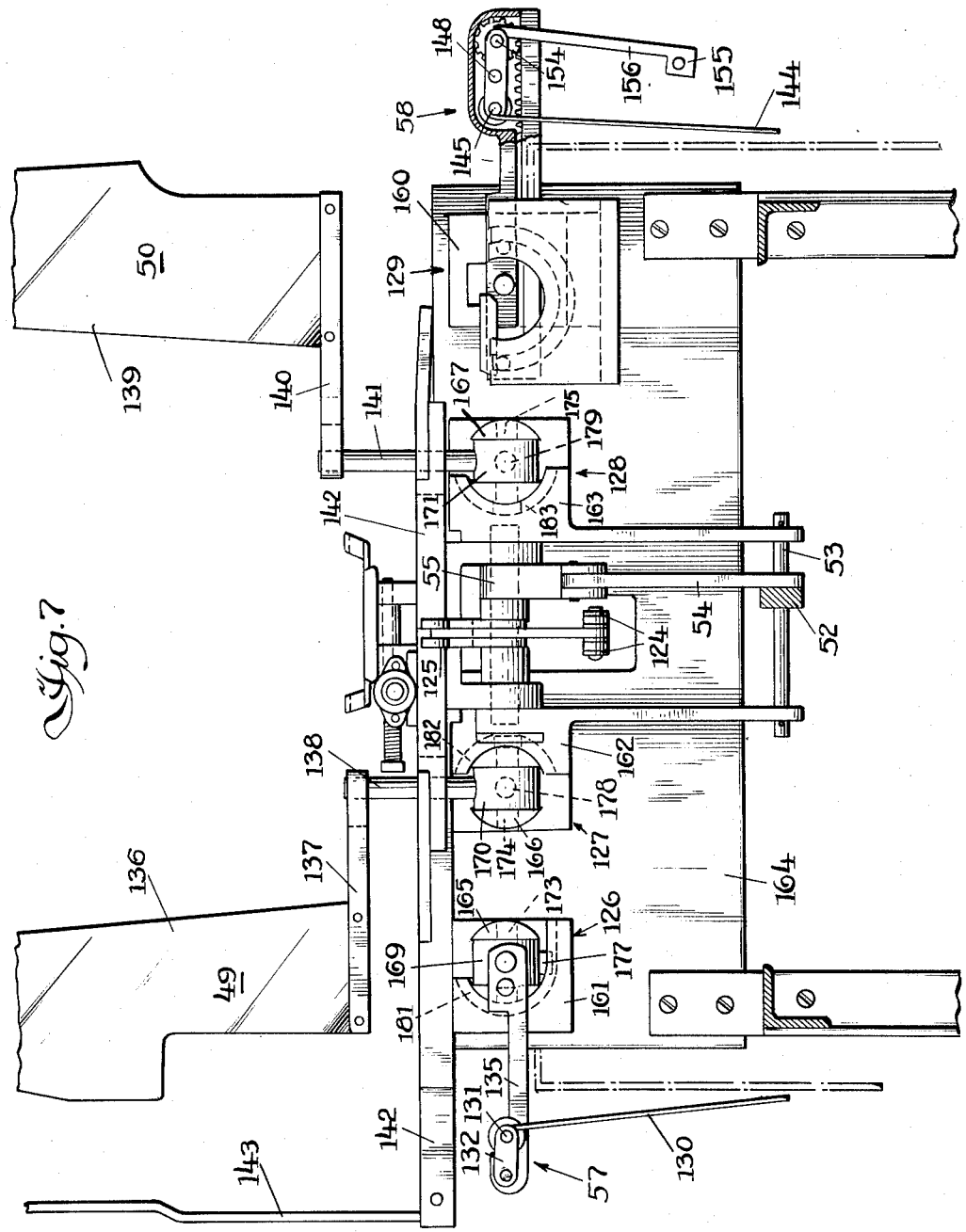

Jan. 25, 1966  D. A. FREEMAN  3,231,157
FOLDING DEVICE
Filed Feb. 10, 1961  16 Sheets-Sheet 7
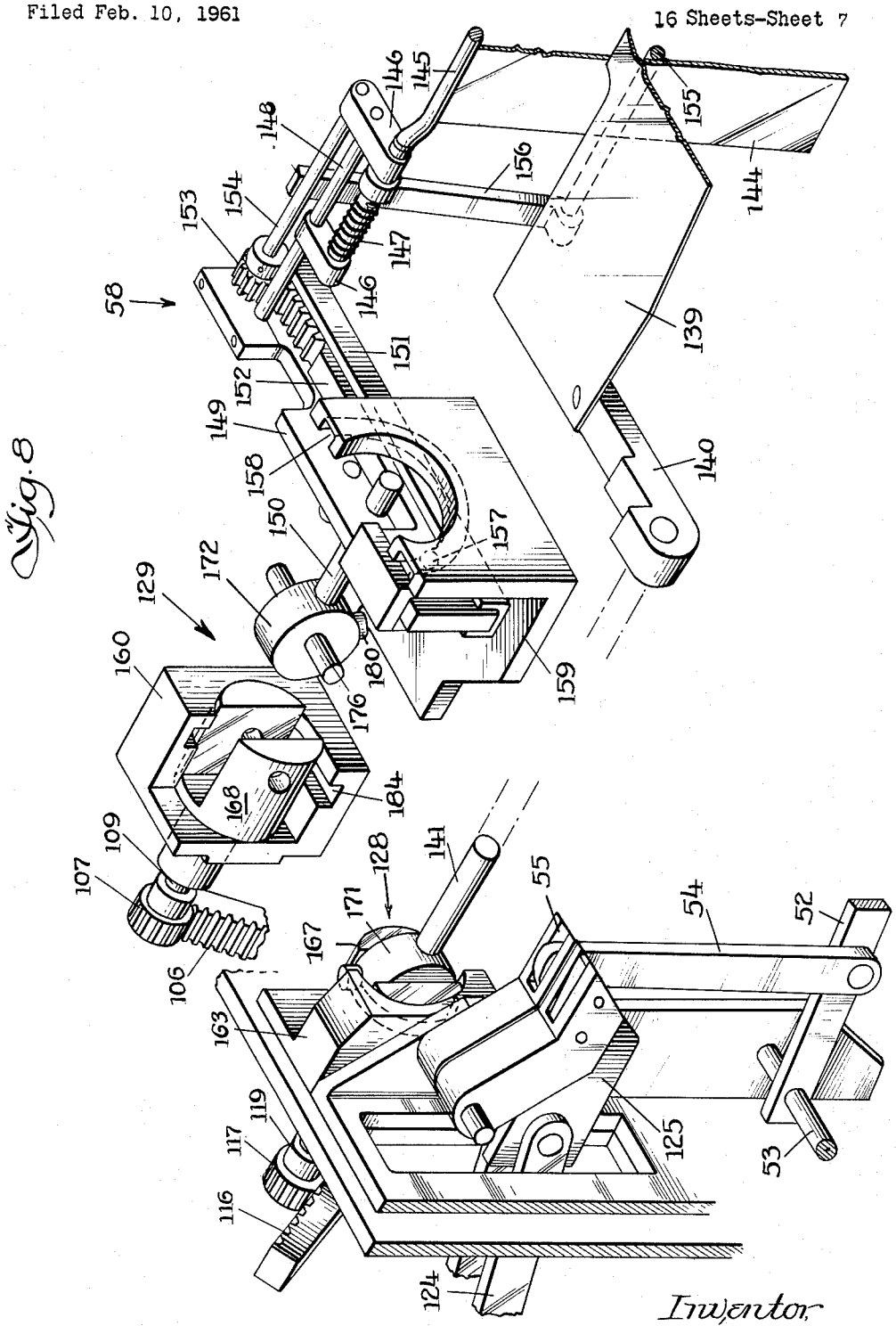
Inventor,
David A. Freeman,
By: Schneider, Dressler, Goldsmith & Clement, Attys.

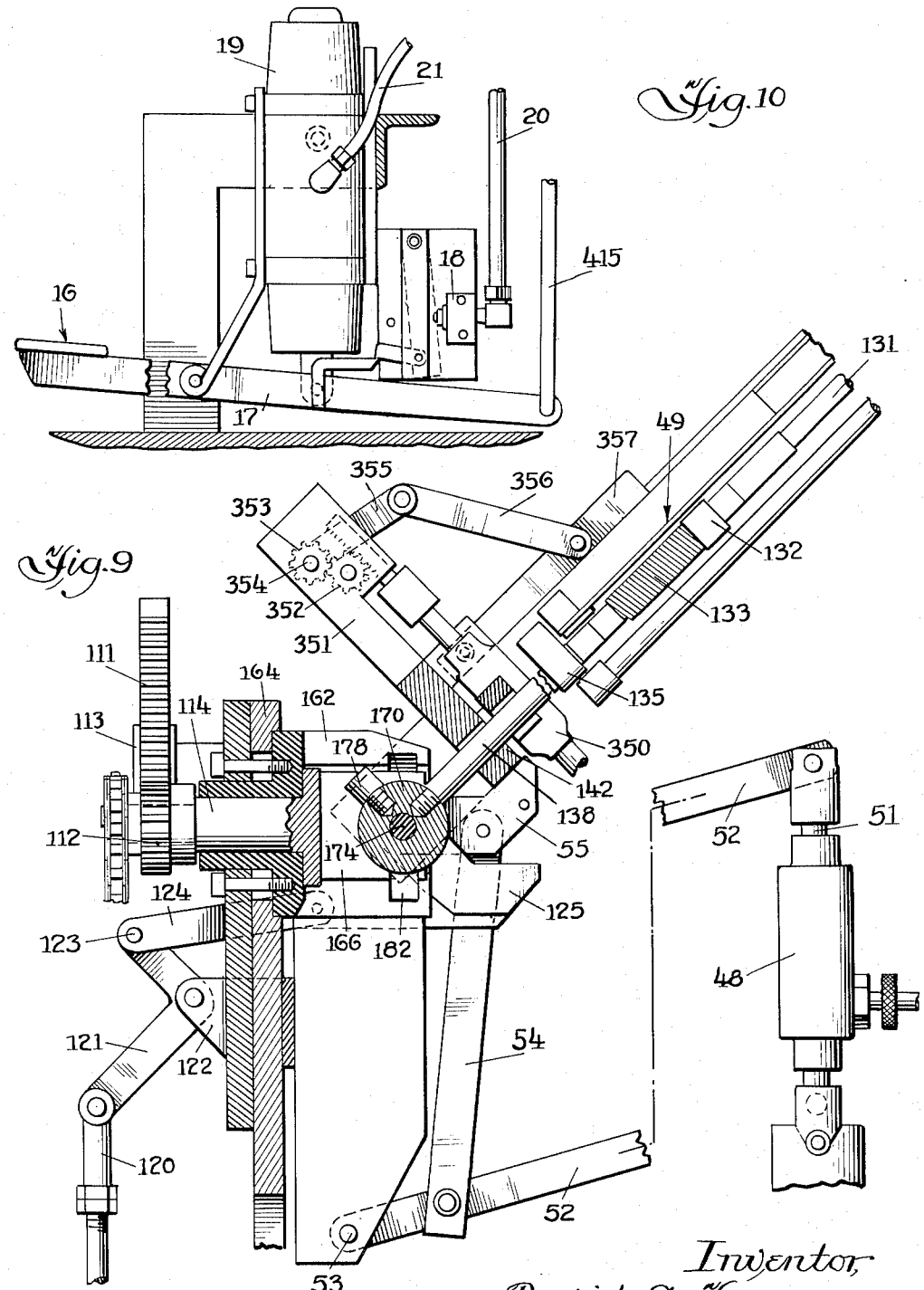

Jan. 25, 1966 D. A. FREEMAN 3,231,157
FOLDING DEVICE
Filed Feb. 10, 1961 16 Sheets-Sheet 9
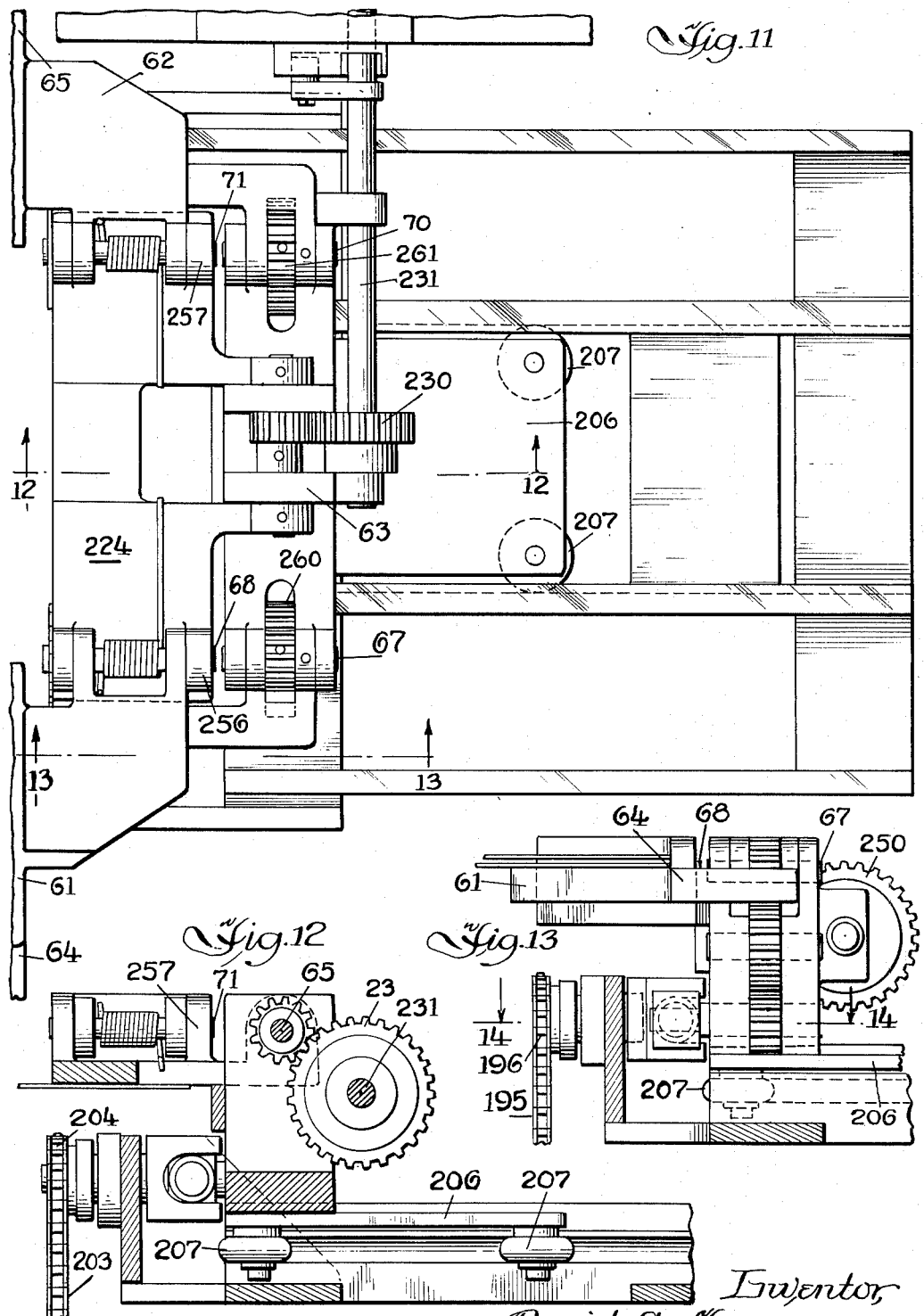
Inventor
David A. Freeman,
By Schneider, Dressler, Goldsmith & Clement, Attys.

Jan. 25, 1966  D. A. FREEMAN  3,231,157
FOLDING DEVICE

Filed Feb. 10, 1961  16 Sheets-Sheet 10

Inventor,
David A. Freeman
By: Schneider, Dressler, Goldsmith & Clement, Attys

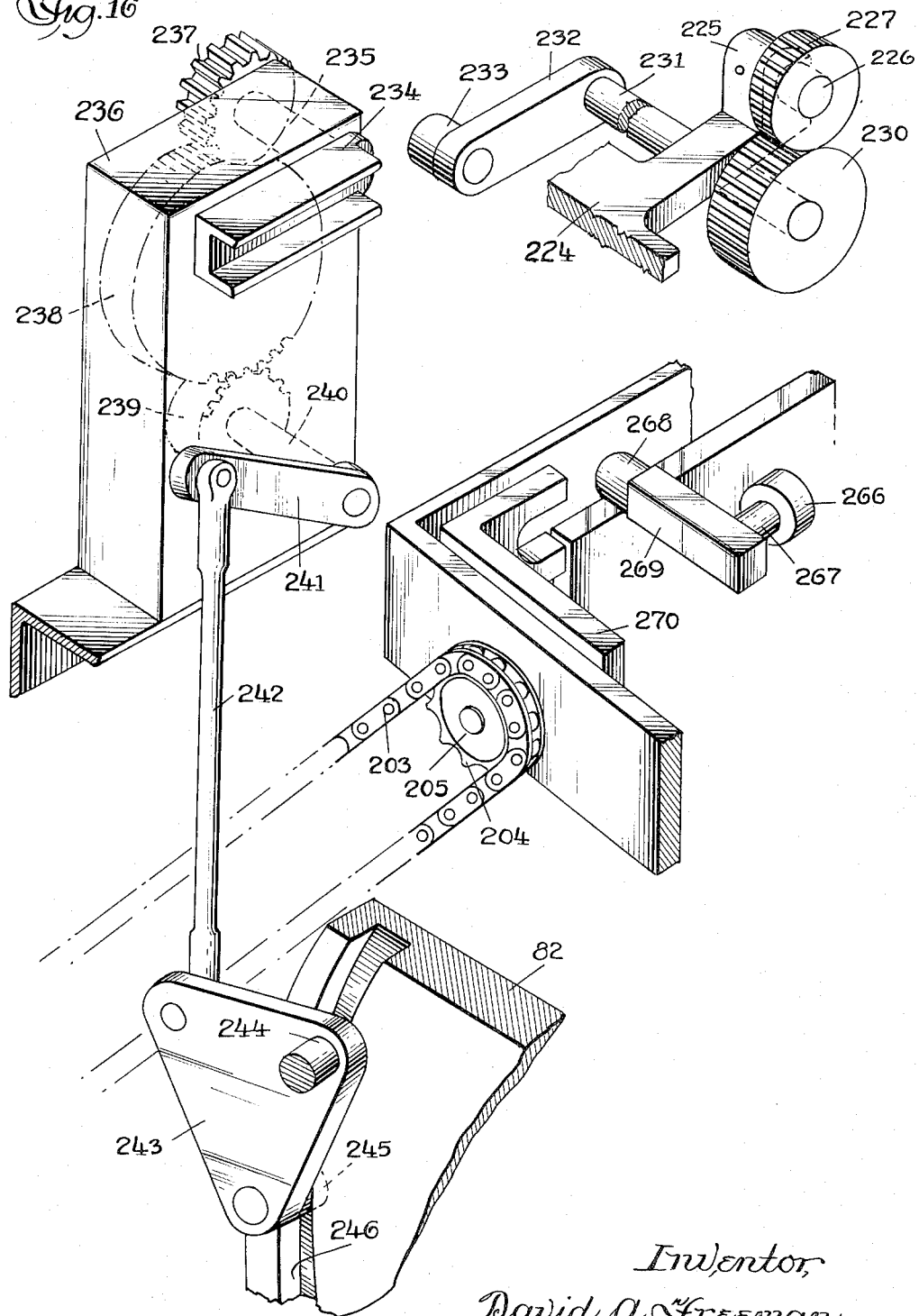

Inventor,
David A. Freeman,
By: Schneider, Dressler, Goldsmith & Clement, Attys

Jan. 25, 1966  D. A. FREEMAN  3,231,157
FOLDING DEVICE
Filed Feb. 10, 1961  16 Sheets-Sheet 13
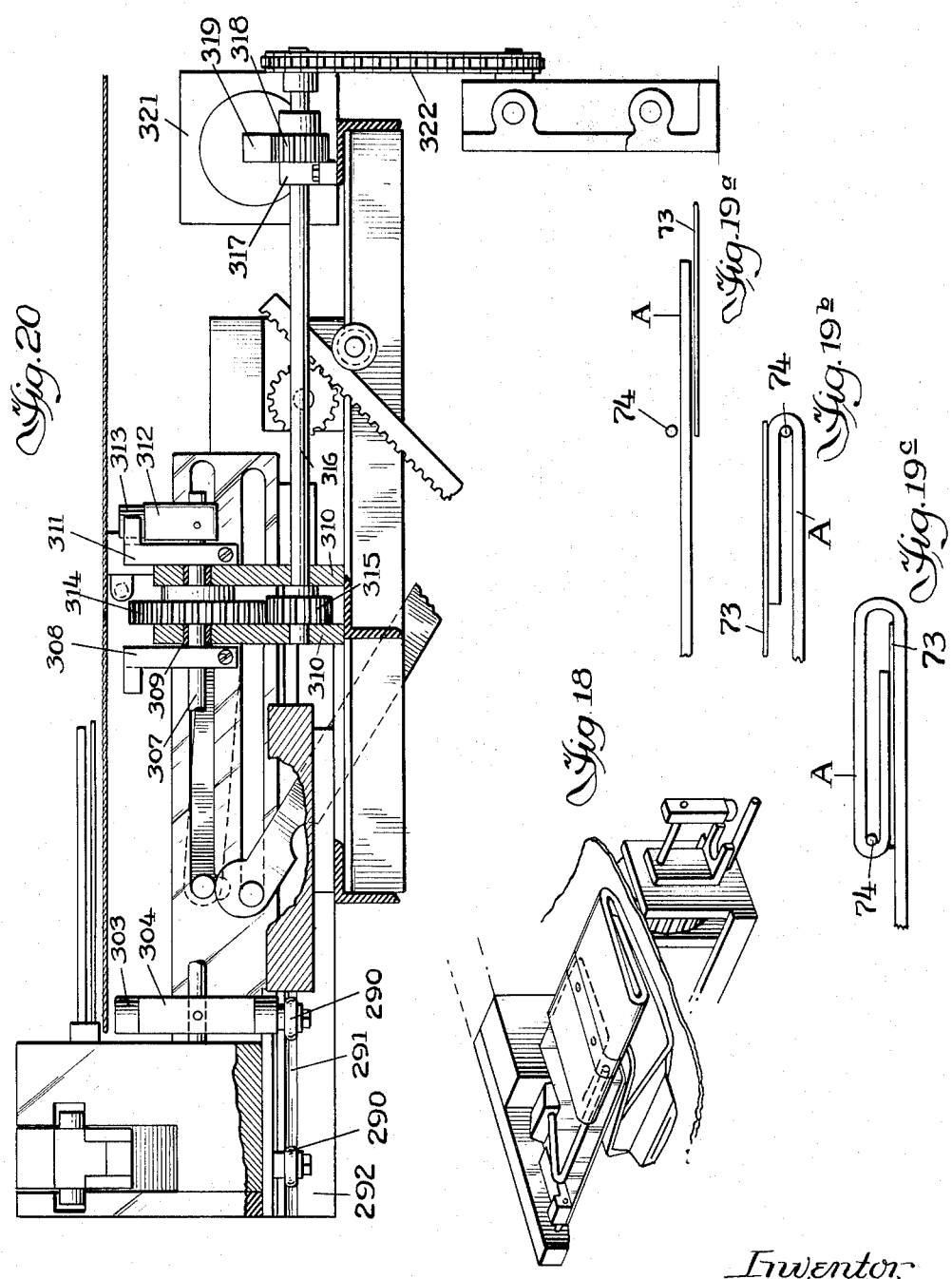
Inventor,
David A. Freeman
By: Schneider, Bressler, Goldsmith & Clement, Attys

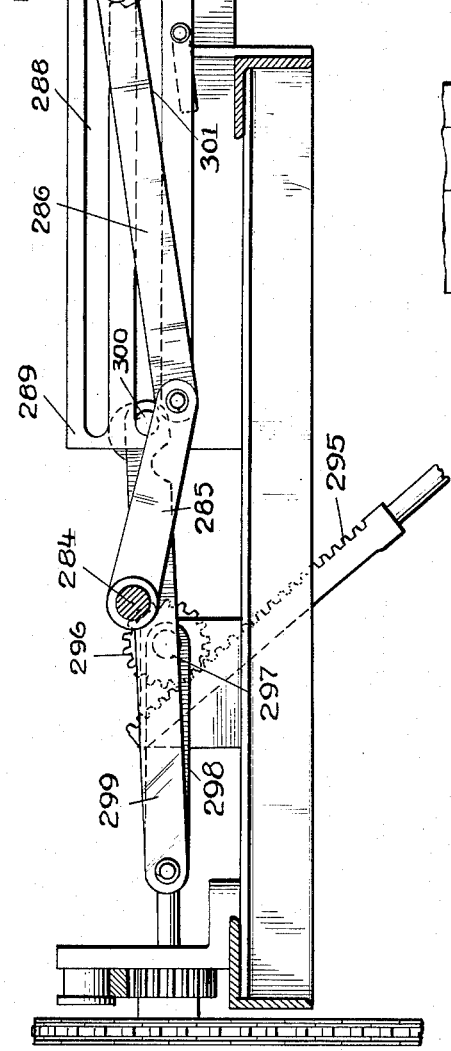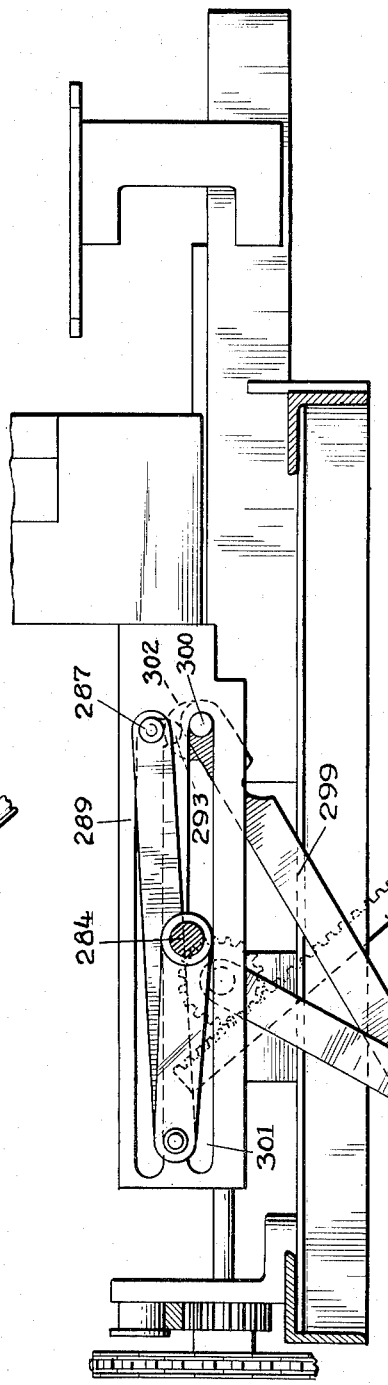

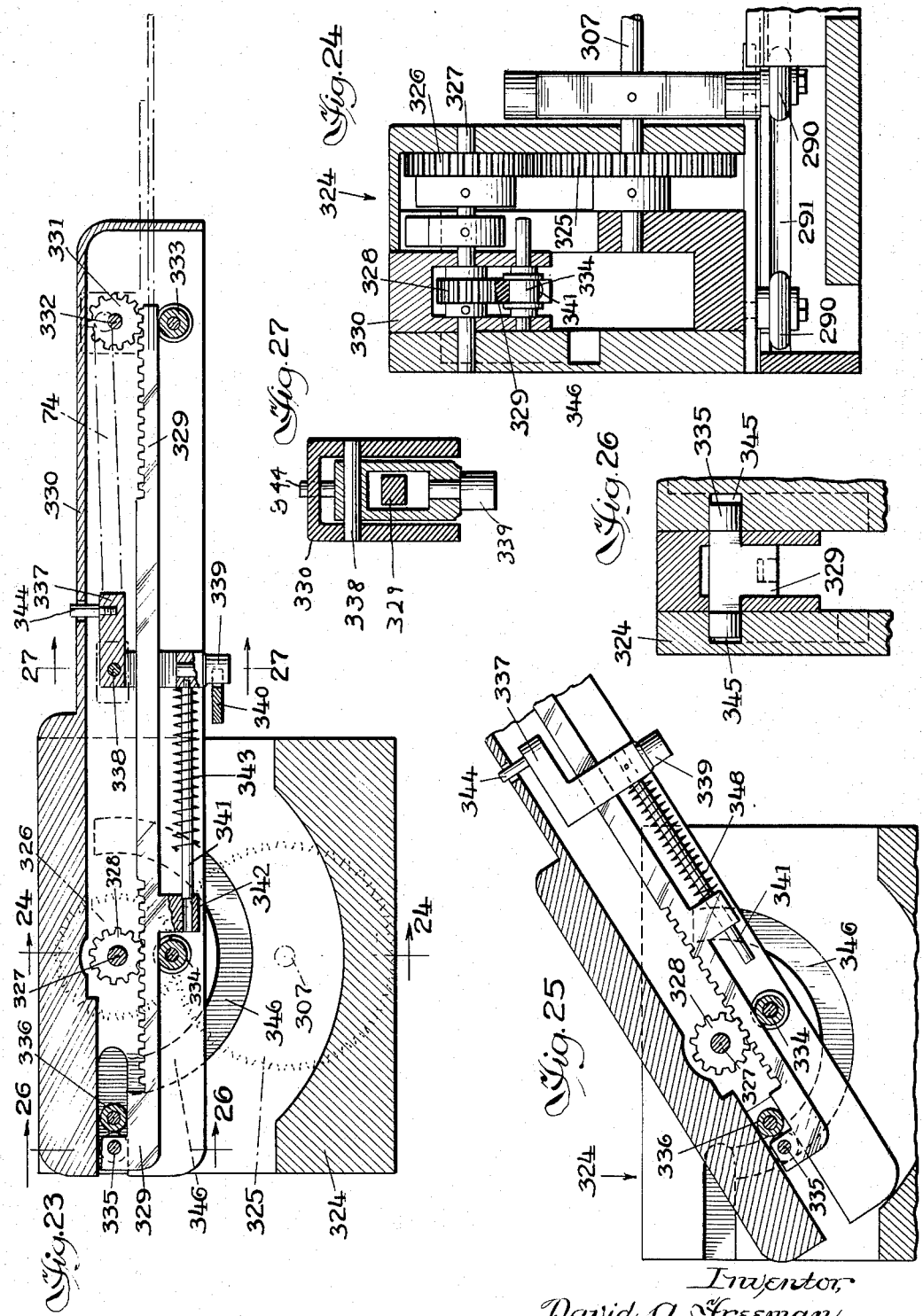

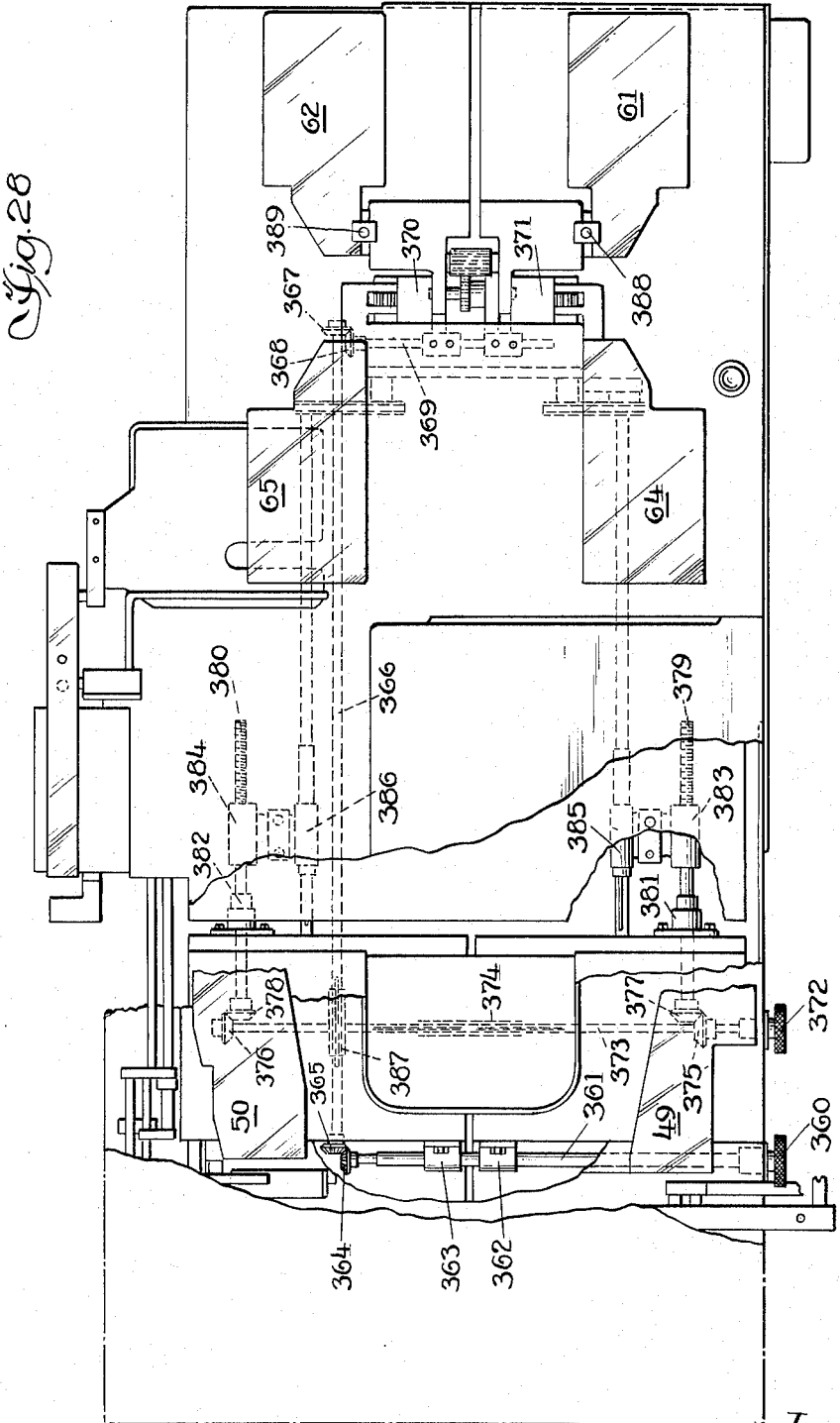

United States Patent Office 3,231,157
Patented Jan. 25, 1966

3,231,157
FOLDING DEVICE
David A. Freeman, 1550 Lake Shore Drive, Chicago, Ill.
Filed Feb. 10, 1961, Ser. No. 88,445
26 Claims. (Cl. 223—37)

The present invention relates to a device and method for folding flexible articles such as articles of fabric or plastic, etc. More particularly, the present invention is concerned with automatically folding such articles.

There is described hereinbelow an illustrative embodiment of the invention in connection with folding a garment such as a shirt, but it should be appreciated that the principles of this invention have general folding utility and applicability and that there is no intention to limit the invention to the particular embodiment. Further, it should be appreciated that all forms of flexible material may be folded in accordance with the principles and method of this invention, and on devices embodying the principles of this invention. Herein, the expression "fabric" is intended to include all forms of such flexible material, including flexible metallic material as well as fabric, both woven and non-woven, felted materials and plastic.

While the illustrative embodiment of this invention described hereinbelow is described in connection with garment folding generally, and shirt folding in particular, it should be appreciated that this is merely exemplary and that the term "garment" as well as the term "shirt" are intended to be generic to all articles foldable in accordance with this invention, and on devices embodying the same.

It is critical and essential to the garment manufacturing industry as well as the laundry and dry cleaning industries, particularly with increasing costs of doing business and increasing labor costs, that the garment folding operation be effected rapidly, efficiently and effectively. Heretofore, folding operations were effected manually or semi-automatically with folding assisting devices which required a substantial amount of operator attention and labor. Moreover, garment folding is a tedious task resulting in operator fatigue after short periods of work. Since the folding operator normally is one member of a finishing team, fatigue on the part of this person often resulted in slowdown of the entire team.

In accordance with the present invention, folding can be effected completely automatically with no more labor involved than merely placing the flattened garment on the mechanism and then removing the folded garment. And, uniquely, the machine duplicates hand folding; that is, it performs the same sequence of folding; to wit, sleeves, sides and then tail fold-up, considered most desirable by the trade. Of course, this sequence can be varied, if desired, by proper alteration of the cam arrangement in the machine. In addition, embodiments of this invention are operable to automatically fold such garments as short sleeve shirts without partial hand folding which was required by heretofore known so-called "automatic" folding devices. To operate the machine, irrespective of the garment thereon, the operator need merely press a button.

In shirt folding, for example, an embodiment of this invention is effective to mold or shape the collar of the shirt and, successively, fold the sleeves across the back of the shirt, fold the sides and shoulders inwardly over the back of the shirt, and then fold the tail portion upwardly over the back of the shirt, to form a neat and compact package of a fully folded shirt. The illustrative embodiment of this invention, which is shown in the drawings and described in detail hereinbelow, is effective to automatically perform all of these functions.

The foregoing and numerous other advantages of the invention will readily appear from the following description and from the accompanying drawings, in which each and every detail shown is included as a part of this specification, in which like reference numerals refer to like parts, and in which:

FIG. 4 is a head end view of the mechanism with cover parts thereof removed for clarity;

FIG. 5 is a longitudinal sectional view of the mechanism as viewed substantially along the line 5—5 of FIG. 1;

FIG. 6 is a perspective view of the collar back pressing and clamping mechanism for the collar forming operation when shirts or similarly shaped articles are folded on the mechanism;

FIG. 7 is a transverse sectional view at the head end of the mechanism, taken substantially along the line 7—7 of FIG. 5;

FIG. 8 is a diagrammatic, perspective view of a portion of the folding arm operating mechnism;

FIG. 9 is a fragmental, longitudinal, sectional view taken substantially along the line 9—9 of FIG 1;

FIG. 10 is a fragmental sectional view taken substantially along the line 10—10 of FIG. 2 and showing the foot pedal operating portion of the mechanism;

FIG. 11 is a fragmental plan view of the tail clamping and side folding portion of the mechanism;

FIG. 12 is a longitudinal sectional view taken substantially along the line 12—12 of FIG. 11;

FIG. 13 is a fragmental, logitudinal, sectional view taken substantially along the line 13—13 of FIG. 11;

FIG. 16 is a fragmental, perspective, diagrammatic view of portions of the drive for the tail clamping and side folding portions of the mechanism;

FIG. 18 is a diagrammatic, perspective view showing a shirt folded about the tail fold-up mechanism;

FIGS. 19a, 19b and 19c are diagrammatic illustrations of the folding procedure effected by the tail fold-up mechanism;

FIG. 20 is a transverse sectional view taken substantially along the line 20—20 of FIG. 2 and showing operating portions of the tail fold-up mechanism and the drive therefor;

FIG. 21 is a longitudinal sectional view of the tail fold-up drive taken substantially along the line 21—21 of FIG. 2;

FIG. 22 is a view similar to FIG. 21 but showing the arrangement in a moved position;

FIG. 23 is a longitudinal sectional view of the tail fold-up mechanism taken substantially along the line 23—23 of FIG. 1;

FIG. 24 is a vertical sectional view of the tail fold-up mechanism, taken substantially along the line 24—24 of FIG. 23;

FIG. 25 is a fragmental illustration of a portion of the mechanism shown in FIG. 23 but showing the same in a moved or changed position;

FIG. 26 is a fragmental sectional view of a portion of the mechanism shown in FIG. 23 and viewed substantially along the line 26—26 of FIG. 23;

FIG. 27 is a fragmental sectional view of the portion of the mechanism shown in FIG. 23 and viewed substantially along the line 27—27 of FIG. 23; and, FIG. 28 is a plan view similar to FIG. 1 but showing an arrangement for adjusting the mechanism to handle different widths, weights, thicknesses and lengths of garments.

Figure 1:
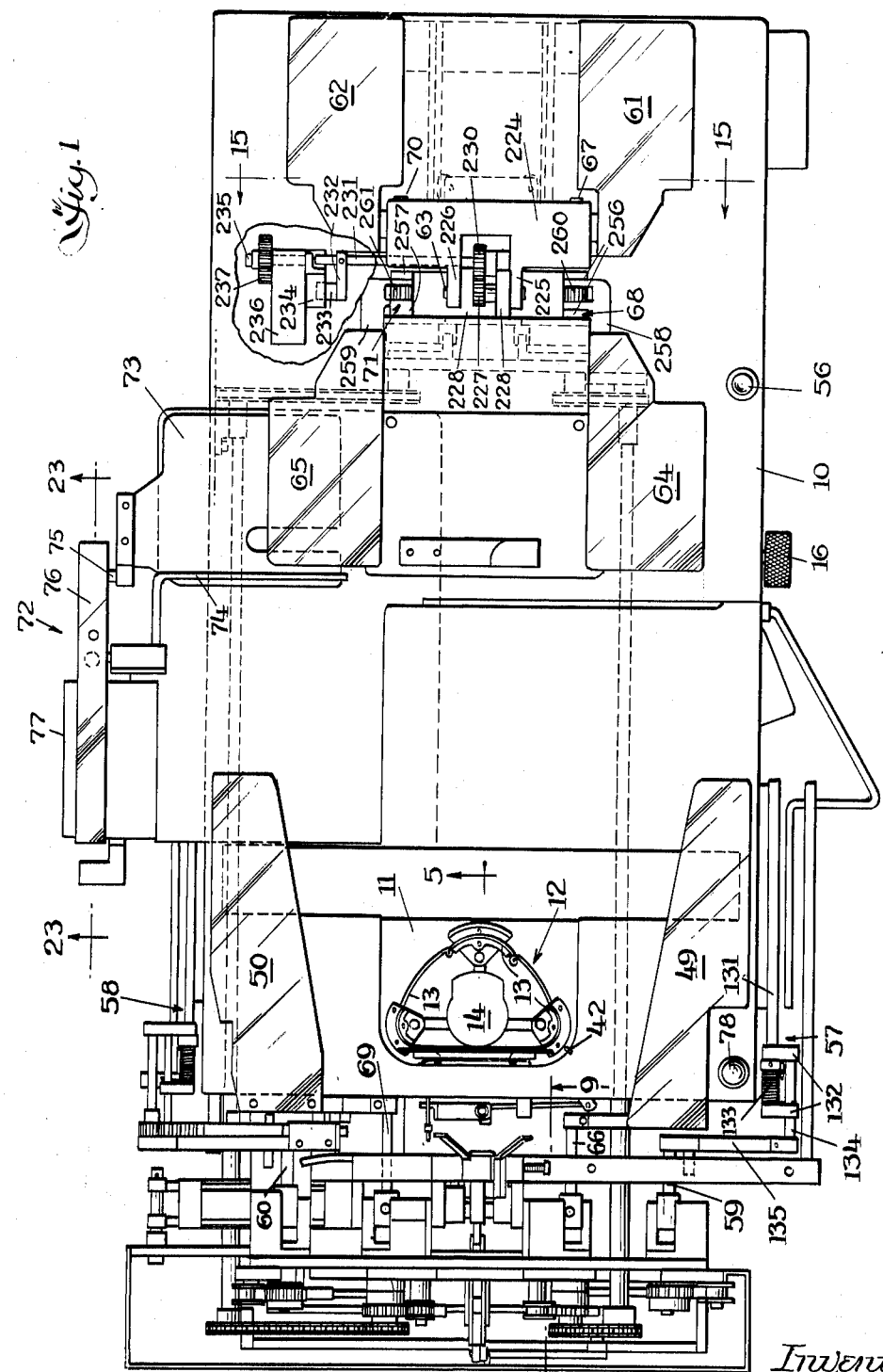
FIG. 1 is a plan view of the mechanism with portions of the cover parts thereof removed to better illustrate other portions thereof.
Figure 3:
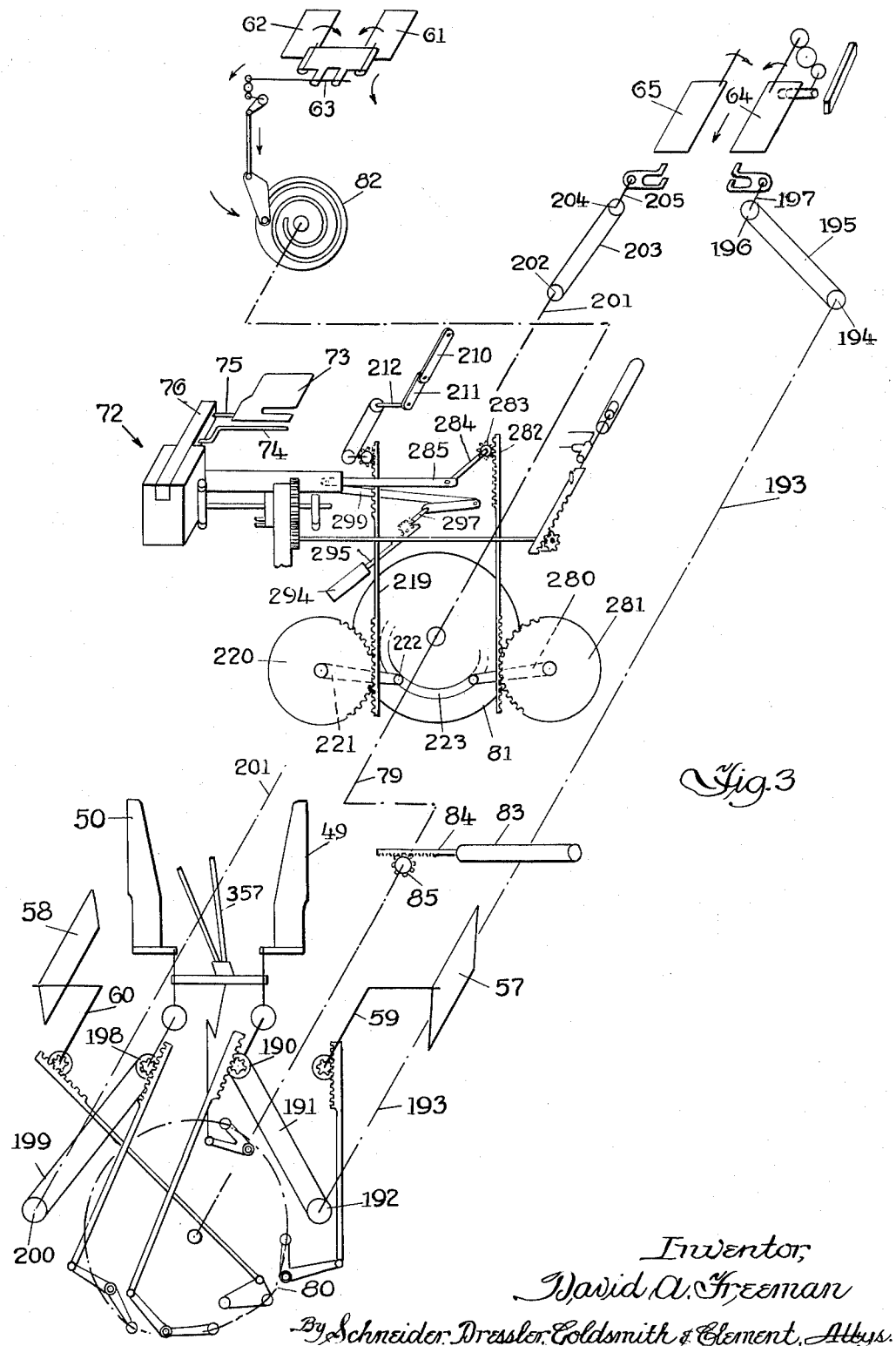
FIG. 3 is a schematic type diagram of the mechanism.

An illustrative embodiment of the present invention, and one which is particularly useful for folding fabric garments such as shirts, is shown substantially completely in FIG. 1 and diagrammatically in FIG. 3. The mechanism includes a supporting frame on which there is mounted a substantially horizontal table or table surface member 10 having an aperture 11 therein adjacent to the head end thereof to expose a collar molding mechanism indicated generally at 12.

*Collar molding mechanism.*—This collar molding mechanism 12 may have any desired form or configuration but, generally, most desirably includes a set of three collar contacting members 13 which are movable or contractable and expandable into and out of the space beneath a yoke plate or canopy 14. Generally, the collar molding mechanism 12 is contracted so that a buttoned shirt collar can be placed thereover conveniently. Thereafter, the mold expands so that the neck band contacting members move apart to stretch the shirt collar, press and mold the same to a desirable shape, such as a heart shape.

The collar molding mechanism incorporated in this embodiment of the invention is normally held in expanded condition as shown in greater detail in FIGS. 5 and 6. It is pneumatically contracted by a piston and cylinder assembly 15 which is controlled by operation of a foot pedal 16 shown in FIGS. 2 and 10. When the foot pedal 16 is depressed, a three-way control valve 19 is operated to supply air through conduit 21 from an air supply source (not shown) to a cylinder 15. When the pedal is released, the valves 18 and 19 are operated to exhaust air from the system through the conduits 20 and 21 to initiate a reverse cycle operation.

The cylinder 15 is mounted on the frame at 22 so that the piston rod 23 moves forwardly toward the head end of the machine. As it moves, the piston rod drives a connecting rod 24 against the force of a biasing spring 25 to operate a crank linkage 26 that contracts the collar contacting members 13.

The connecting rod 24, at its end opposite to the piston rod 23, is connected to a block 27 which is firmly mounted on a slide bar 28 of the collar contacting member operating linkage 26 and effectively mounted for longitudinal movement only. Also firmly secured to the slide bar 28 is a pull lever 29 which slidably receives a pull rod 30 therethrough. The pull rod 30 has a nut 31 on its outer end so that when the bracket 29 is moved forwardly a certain distance toward the head end of the mechanism, the pull rod 30 will likewise move therewith after the bracket contacts the nut.

The other end of the pull rod 30 is connected to a bracket 33 on which a collar back pressing plate 34 is mounted for pivotal movement toward and away from the head end portion of the neck bank contacting members 13 so as to press the back of the shirt collar when the collar molding mechanism is released. A spring 35 on the pull rod 30 and disposed between a collar 36 thereon and a portion 37 of the frame of the mechanism biases the collar back pressing plate toward a collar back pressing position.

When it is desired to operate the shirt folding mechanism without effecting complete expansion of the collar molding mechanism, the spring biased movement of the collar contacting members of the mold may be limited by a locking linkage which includes a crank 38 pivotally mounted at its center 39 on a portion 40 of the rigid frame of the mechanism. One arm 41 of the crank 38 carries an operating handle 42 which extends through the opening 11 in the table top 10, as shown in FIG. 1. The other arm 43 of the crank 38 is connected to a sliding stop bar 44. The connection between the sliding bar or rod 44 and the crank 38 is pivotal while an intermediate portion of the slide bar 44 is carried in a bracket 45 mounted on the frame member 37. The outer free end 46 of the slide bar 44 is disposed to project into the path of the operating block 27 or be moved out of that path depending upon the manual positioning of the handle 42 on the crank 38.

When the crank 38 is moved in a clockwise direction, as viewed in FIG. 6, the end 46 of the stop bar 44 will be disposed in the path of the operating block 27 so as to limit movement thereof by the force of the biasing spring 25 when air pressure is removed from the cylinder 15. When the collar mold mechanism is operated for shirt removal, the handle 42 is moved counterclockwise, as viewed in FIGS. 1 and 6, by a spring 47, and the end 46 will be moved out of the way of the operating block 27, thereby permitting full expansion of the collar molding mechanism.

*Folding and return movement.*—Approximately simultaneous with contraction of the collar mold, air is also supplied to cylinder 48 (seen in FIGS. 5 and 9). The mechanism connected thereto may act to raise a pair of inner folding arms 49 and 50 at the left and right sides of the machine, respectively, when viewed from the tail end of the machine if the folding arms are not already in an up position by reason of the cam wheel action, which is described below.

The piston rod 51 of piston 48 moves upwardly and carries upwardly with it the free end of a lever 52. Since the other end of lever 52 is pivotally connected to the frame at 53 and, since lever 54 is pivotally connected thereto at an intermediate position thereon, lever 54 also moves upwardly. A lifting crank 55 connected to the upper end of lever 54 is, therefore, pivoted counterclockwise. If the folding arms 49 and 50 are not already in a raised position, crank 55 will act to lift them.

At this stage, the foot pedal is released and the collar of the shirt is grasped by the collar mold. The mold may also act to press and shape the collar, as more thoroughly described in existing patents, such as United States Patent No. 2,942,763, issued June 28, 1960.

After the collar of the shirt has been grasped by the collar mold, the automatic operating button 56 is depressed. This causes the folding mechanism to begin its automatic folding sequence.

Folding arms 49 and 50 are first lowered to clamp the shoulder and back portion of the shirt against table 10 and to provide a folding pattern edge for the next fold in the automatic folding sequence. Simultaneously, or in slight sequential order, the tail clamping mechanism closes by pivotal movement of tail arms or plates 61 and 62 about a common transverse axis 63. Upon complete fold movement of tail clamping arms or plates 61 and 62 they are substantially superimposed over the side folding arms or plates 64 and 65 so as to clamp the tail end of the shirt.

At about the same time with the tail clamping movement, a pair of outer folding arms 57 and 58 at the left and right sides of the machine, respectively, move successively about pivot axes 59 and 60 and inwardly to fold the shirt sleeves inwardly against the folding pattern edges of arms 49 and 50 and over the back portion of the shirt.

The next step in the operation is a side folding movement of the shirt. The inner shoulder folding arm 49 and the superimposed tail clamping arms or plates 61 and 64 at the left side of the machine, with the tail of the shirt clamped therebetween are moved about pivot axis 66 for arm 49 and coaxially aligned pivot axes 67 and 68 for the tail clamping arms 61 and 64. This folds the left side (as viewed in FIG. 1) of the shirt. The edge of a blade or plate on arm 57 and the inner edge of arm 61 act as the folding edges for this side fold.

As soon as the arms 49, 61 and 64 have folded the left side and shoulder portion of the shirt over onto the back of the shirt, shoulder folding arm 50 and superimposed tail clamping arms 62 and 65 pivot about pivot axis 69 for arm 50 and coaxially aligned pivot axes 70 and 71 to fold the right side and shoulder portion of the shirt onto the folded left side of the shirt. Arms 58 and 62 act as the folding edges for this side fold.

Next, the tail fold-up mechanism 72, including folding plate 73 and folding arm 74, are moved inwardly of the machine from the right side thereof toward the center with the arm 74 disposed above the shirt and the blade 73 disposed therebelow. After the shirt is clamped between arms 73 and 74, the tail clamping blades 61, 62, 64 and 65 are withdrawn from the tail of the shirt by a longitudinal movement away from the collar clamping end of the machine. As soon as the blades 61, 62, 64 and 65 are fully withdrawn, blade 73 is pivoted about its axis 75 toward the head end of the machine while the arm 74 acts as folding pattern edge. Subsequently, both the blade 73 and the arm 74 are rotated with a support arm 76 therefor, about a pivot extending transversely of the machine substantially centrally of the fold-up arm drive mounting 77 described in detail hereinbelow.

When the mechanism is moved through the positions described immediately above, the shirt is fully folded. However, blade 73 and arm 74 are still within the folds. Before their removal, it is necessary to hold the shirt in a folded condition until it can be banded or pinned. This is accomplished by actuation of a valve limit switch by the tail fold-up mechanism 72. Such activation causes cylinder-piston assembly 350 to act upon a gear train-crank mechanism to lower the tail clamping arm assembly 357 onto the back of the upper collar end of the folded shirt. Then blade 73 and arm 74 are removed by a sidewise (to the right in FIG. 1) movement of tail fold-up mechanism 72. Arm 76 then pivots back to the position shown in FIG. 1, and blade 73 pivots to its normal unactuated position. If desired, the shirt may then be pinned or banded to retain its folded condition. This ends the automatic folding cycle.

After pinning or banding the shirt, the foot pedal 16 is depressed to contract the collar mold and to operate the cylinder-piston assembly 48. Operation of the assembly 48 raises the shoulder folding arms 49, 50, 57 and 58 to an upstanding position. The operator may then bag the shirt and remove it by an outward sliding movement from the shoulder folding arms 49 and 50 and outer folding arms 57 and 58.

Upon release of the foot pedal 16 after banding and removal of the shirt, the machine automatically begins to unfold. The shoulder folding arms first lower by their own weight as the pneumatic pressure in cylinder 48 diminishes and then the tail clamp 357, which holds the shirt folded, raises. The tail clamping and lower side folding assembly then moves in and opens substantially simultaneously with the shoulder folding arms. The right side unfolds about axes 69, 70 and 71. The left side unfolds about axes 66, 67 and 68. Thereafter, but before the tail clamping arms are unfolded about pivot axis 63, the arms 58 and 57 open successively.

Obviously, the unfolding movement of the fold-up mechanism and the tail clamping and side folding mechanism, and the upward movement of the inner arms, may be effected by activation of a return cycle button, if desired, at the conclusion of the fold-up operation.

The mechanism for effecting the numerous foregoing automatic operations is schematically illustrated in FIG. 3 wherein it is shown that the coordinating system for the mechanism is operated and controlled from a main drive shaft 79 to which there is secured a plurality of rotating cam wheels 80, 81 and 82 which control the operation of the arm and shoulder folding arms, the tail clamping mechanism and the side folding mechanism, respectively.

Figure 2:
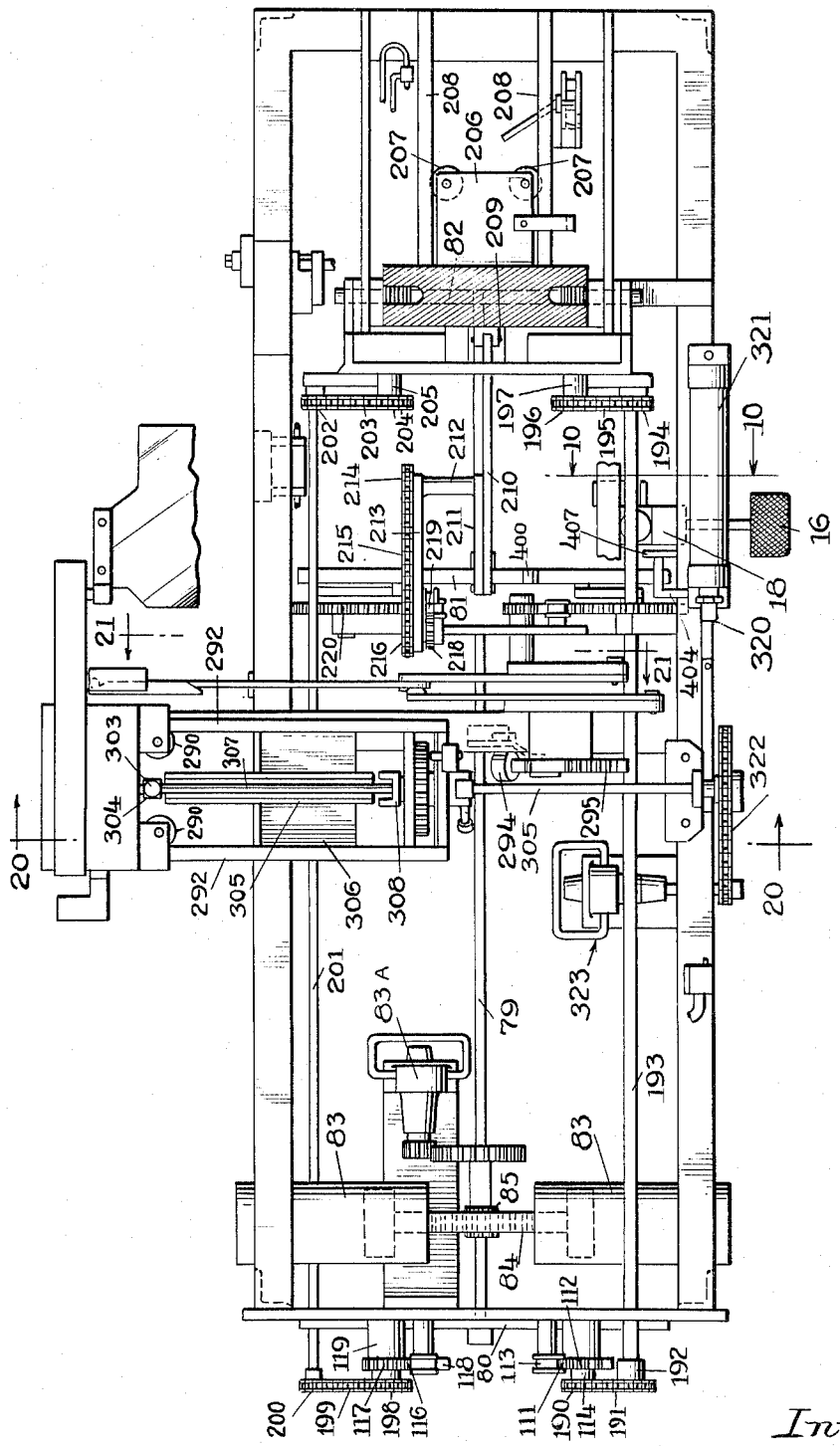
FIG. 2 is a plan view similar to FIG. 1 but with many other parts of the mechanism removed for clarity.

The main drive shaft 79 is directionally rotated by a double main drive cylinder and piston assembly 83 which rotates shaft 79 by the action of an integral rack 84 on the piston with a pinion 85 on the shaft (see FIG. 2). A speed regulator 83A controls the rate of rotational movement of shaft 79.

Cam followers operatively engaged with the rotating cam wheels 80, 81 and 82 operate the various clamping and folding mechanisms described briefly above and in detail hereinafter (see FIGS. 2, 3, 4 and 15).

*The arm and shoulder folding mechanism.*—The mechanism constituting the arm and shoulder folding mechanism is illustrated in detail in FIGS. 4, 5, 7, 8, 9 and 10. With particular reference to FIG. 4, the double main drive cylinder 83 with the piston rack 84 thereon is shown engaged with the pinion 85. Taken in conjunction with FIG. 5, these figures show that the main drive shaft 79 is journaled at the head end of the machine in a bearing 86 mounted on a frame plate 87 of the frame structure. The cam wheel 80 for operating the arm and shoulder clamping and folding arms is mounted on shaft 79 and is engaged by a plurality of cam followers 88, 89, 90, 91 and 92 which are, respectively, mounted at the ends of cranks 93, 94, 95, 96 and 97 which are center pivoted in a fixedly mounted frame plate 98. The cranks are pivotally mounted for pivotal movement of the ends of the arms thereof as the followers follow the contour of the convoluted cam groove 99 in the cam wheel 80.

Cam groove 99 is contoured with a single rise 100 therein which, during rotation of the cam, reaches the followers 92 and 88 through 91, successively, during closing operation or folding operation of the mechanism. During the unfolding operation, the cam followers are reached and held by the rise 100 in inverse order.

The first follower to be engaged by the rise 100 is the follower 92 on the crank 97. The end of the other arm of this crank is pivotally connected to a connecting rod 120 which operates to lift the arm mechanism at the head end of the machine to a raised position as shown in FIG. 9 in substantially the same manner as the cylinder 48 is effective to raise the mechanism. The structure by which the raising of the arm mechanism is accomplished is specifically shown in FIGS. 5 and 9 wherein it is seen that the connecting rod 120 is pivotally connected to a crank 121 that is center pivoted on ear 122 extending out from the head end of the frame. The other arm of the crank 121 is pivotally connected at 123 to a link 124 which ties the same to a pivoted lifting lever 125 which is substantially the same as the lifting lever 55 which is linked to the cylinder 48 for a lifting of the head-end arms.

When the rise 100 passes the follower 92, the arms 49 and 50 are lowered onto the article to be folded.

The second follower to be engaged by the rise 100 during rotation of the cam wheel 80 in a clockwise or folding operation direction as viewed in FIG. 4, is the follower 88 at one end of an arm of the crank 93. The other arm of the crank 93 is connected through a tie rod 101 to a rack 102 which is intermeshed with a pinion or gear 103 and held in position by a backing roller 104. The gear 103 is mounted on a shaft 105 which, when rotated, operates to pivot the outer sleeve folding arm 57 at the left side of the machine (see FIG. 1) into a folded position (see also FIGS. 4 and 7).

After the cam follower 88 for the left side folding arm is engaged by the rise 100 of the cam groove 99, it passes into an elongated dwell portion 100a which is substantially circular and concentric about the center of the main drive shaft 79. The dwell 100a holds the follower 88 in a fixed position whereby the arm 57 is held in a folded position during the remainder of the operating cycle of the mechanism.

The next follower to be engaged is the follower 89 on the crank 94. The other arm of this crank is pivotally connected to a connecting rod 106 which, at its other end, carries a rack 106' which is intermeshed with a pinion 107 and held in such intermeshing engagement by a backing roller 108. As the rise 100 passes the follower 89, the rack 106' is driven outwardly of the machine thereby rotating the pinion 107 on the shaft 109 on which it is secured, in a clockwise direction as viewed in FIG. 4 to rotate the other outer folding arm 58 inwardly of the machine, successively after inward pivotal movement of the left side folding arm 57.

The fourth follower to be engaged by the rise is the follower 90 on the crank 95. The other arm of this crank is connected to a connecting rod 110 carrying a rack 111 at its free end, the rack 111 being engaged with a pinion 112 and held so engaged by a back-up roller 113. The pinion 112 is fixed on a shaft 114 which is effective to rotate the left side inner shoulder folding arm 49.

The fifth follower to be engaged by the rise 100 of the cam groove 99 is the follower 91 on the crank 96. The other arm of this crank is connected to a connecting rod 115 which carries a rack 116 disposed in engagement with a pinion 117 and held in position by a back-up roller 118. The pinion 117 is fixed on a shaft 119 which is connected to the right side inner shoulder folding arm 50 for rotation thereof when the rise 100 reaches the follower 91.

Each of the four head-end folding arms 57, 49, 50 and 58 are mounted on universal joint structures 126, 127, 128 and 129, respectively, as shown in FIGS. 7 and 8.

The left side folding arm 57 includes a garment holding blade 130 which is pivotally mounted on a pin 131 (see FIGS. 1 and 7) journaled in a pair of supports 132. It is spring-biased in a counterclockwise direction, as viewed in FIG. 7, by a spring 133 (shown in FIG. 1). Thus it is normally biased toward the table, and against any garment that may be disposed between it and arm 49, when the blade is moved to a folded position. The supports 132 are secured on a rod 134 which is connected at its head-end to an arm lever 135, the other end of which is mounted on the universal joint 126 for controlled movement of the arm mechanism 57. The construction of the universal joint 126 (FIG. 8) is explained below in conjunction with the description of the universal joints 127, 128 and 129 below. By this construction, however, when the arm lever 135 is moved clockwise, as viewed in FIG. 7, during the first stage of the folding operation, the blade 130 on the pin 131 will raise the left side sleeve of the shirt and hold the same against the back of the shirt while folding the same tautly about the left side inner folding arm 49.

The left side inner folding arm 49 is constituted by a shirt contacting arm or blade 136 mounted on an arm lever 137 which is secured to an arm carrying rod 138 which forms the pivot axis for the arm and which is secured in a universal mounting joint 127 therefor.

The right side inner folding arm 50 is symmetrical with the left side inner folding arm 49 and, similarly, is constituted by a shirt contacting arm or blade 139 secured to an arm lever 140 mounted on and secured to an arm pivot rod 141 which is secured in the universal joint 128 for that arm.

The inner folding arm pivot rods 138 and 141 also carry and are tied together by a cross bar 142 against which the arm lifting levers 125 and/or 55 may operate for lifting the arms as discussed above in conjunction with FIG. 9. The cross bar 142 also extends to the left side of the machine and the leftmost extremity, which is extended beyond the leftmost extremity of the arm 57, carries a sleeve restraining arm 143 which overlies and prevents the sleeve of the shirt from sliding off of the arm 57 until it is substantially folded about the inner folding arm 49 so that a taut fold may be obtained. Without the arm 143, a stiff, well-starched sleeve might tend to move ahead of the folding arm 57 once the folding operation is started and thereby create a loose fold.

The outer right side folding arm is, in part, similar to the left side outer folding arm in that it includes a blade 144 (see FIG. 8) mounted on a pin 145 which is carried in a pair of arm journal supports 146 in such a manner that a spring 147 on the pin 145 and between the supports 146 biases the blade 144 in a clockwise direction, as viewed in FIGS. 7 and 8, to maintain the same against the table and any garment thereon. The supports 146 are secured to a carrying rod 148 which is mounted in an arm lever 149. The arm lever 149, in turn, is fixed on a pivot rod 150 which forms a part of the universal joint 129.

The arm lever 149 has a channel-shaped bottom portion 151 which slidably carries a rack 152 that engages a pinion 153 secured to a supplemental arm rod 154 journaled in the arm lever 149 and in the supports 146 for the arm pin 145. A supplemental sleeve folding arm 155 is secured to a lever 156 which, in turn, is secured to the arm rod 154.

At the end removed from the rack 152, the arm lever carries a cam follower 157 which is received in a cam slot 158 in a bracket and cam block 159 which is secured to the main mounting block 160 forming a part of the universal joint 129 and mounted on the main frame of the machine.

The cam groove 158 is eccentric with respect to the horizontal axis of the pivot rod 150 so that as the arm lever 149 is moved in a counterclockwise direction, as viewed in FIG. 8, the cam follower 157 sliding in the cam groove 158 will cause the rack 152 to move outwardly with respect to the lever 149 thereby causing the pinion 153 to rotate in a counterclockwise direction at a rate greater than the counterclockwise rotation of the lever 149. This movement causes the supplemental arm 155 to be carried to a position extending further to the left than the position of the pin 145 for the arm blade 144 when the arm mechanism 58 is in a folded or closed position. The length of the arm 156 is preferably selected such that the supplemental arm 155 will lie in a fold brake position to hold the shirt when the left side inner folding arm 136 is moved to a folded position for folding of a garment about the supplemental arm 155 during the left side folding operation.

The universal joint mountings for the arms 57, 49, 50 and 58, respectively, starting at the left side of the folding table, are shown in FIGS. 7, 8 and 9. Each of these universal joints 126, 127, 128 and 129, has a fixed bearing block 161, 162, 163 and 160, which are mounted on the frame, and more particularly on a back plate 164 of the frame. Journaled within these bearing blocks are a set of bifurcated substantially cylindrical joint blocks 165, 166, 167 and 168, respectively. Received between the arms of the joint blocks to form knuckle joints therewith are a set of disk-shaped or substantially cylindrical-shaped pivot blocks 169, 170, 171 and 172 each of which is disposed on a pivot or knuckle pin 173, 174, 175 and 176, respectively, extending axially thereof and received in apertures in the arms of the blocks 165–168. These pivot members 169–172, respectively, carry the pivot rods for each of the folding arms at the head end of the table.

Each of the pivot rod carrying blocks is provided with a radially extending guide roller 177, 178, 179 and 180 which is receivable in a guide groove 181, 182, 183 and 184, respectively, in the pivot mounting and journal blocks 161, 162, 163 and 160.

At the head end or side of each of the bifurcated cylindrical joint blocks 165, 166, 167 and 168, the shafts 105, 114, 119 and 109 extend and carry the pinions 103, 112, 117 and 107, respectively, so that rotation of the pinions will effect rotation of the arms through vertical planes. While the arms are rotating, the rollers 177 through 180 are received in the grooves 181 through 184, respectively, and thereby prevent the arms from moving in planes normal to the folding planes.

As each of the arms reaches its inward, folded position, the guide rollers move out of the grooves and are disposed free of the grooves by cutaways in the bearing blocks. This permits vertical movement to a raised position for the folding arms when either of the lifting cranks 125 and 55 are actuated. Of course, when all of the arms at the head end of the table are in a folded position, either of the cranks 125 and 55 will raise all of the arms since they will be interlocked by virtue of their interfolded relation (see FIG. 9).

*Interconnected drive means.*—The drive for folding movement of the inner folding arms 49 and 50, by means of the racks and pinions 111, 112 and 116, 117, is also effective to move the tail clamping and folding blades 61, 64 and 62, 65 with the arms 49 and 50, respectively, in coordinated movement. This is effected, in this embodiment of the invention, by a direct drive connection between the head end folding mechanism and the tail end folding mechanism. The drive connection includes, as seen particularly in FIGS. 2, 3 and 4, a sprocket 190 on the shaft 114, a chain 191 engaging the sprocket 190, and a sprocket 192 engaging the chain and fixed on a counter shaft 193 journaled in the frame of the machine and extending longitudinally thereof for the left side folding arms arrangement. At its tail end, the counter shaft 193 carries a sprocket 194 (FIGS. 2 and 3) which is engaged by a chain 195 that extends upwardly and inwardly to engage a sprocket 196 mounted on a pivot shaft 197 in the tail clamping and folding arrangement and effectively to move the arms 61 and 64 from an outwardly extended open position toward an inwardly disposed closed position.

Similarly, the right side folding arrangement and coordinating mechanism includes a sprocket 198 on the shaft 119 which carries the pinion 117 that is engaged by the rack 116. A chain 199 is intermeshed with the sprocket 198 and with a sprocket 200 on a right side counter shaft 201 journaled in the frame of the machine and extending the length thereof. At the other end of the counter shaft 201, it carries a sprocket 202 which is intermeshed with the chain 203 that engages and drives a sprocket 204 on a pivot shaft 205 for moving the right side tail clamping and folding arms 62 and 65 from an outwardly extended open position toward an inwardly disposed, closed position.

*The tail clamping and lower side folding mechanism.*—
In the operation of the tail clamping and lower side folding mechanism, several movements are effected. These include forward and rearward movement of the entire tail clamping and folding mechanism, rearward movement being effected when the mechanism is removed from the tail of the garment prior to operation of the fold-up mechanism 72, and forward motion being effected prior to the next succeeding folding cycle. Another operation which is effected is the pivotal movement about a transverse axis of arms 61 and 62, pivotal movement about a longitudinal axis for the arms 61 and 64, and pivotal movement about a longitudinal axis for the arms 62 and 65.

Figure 17:
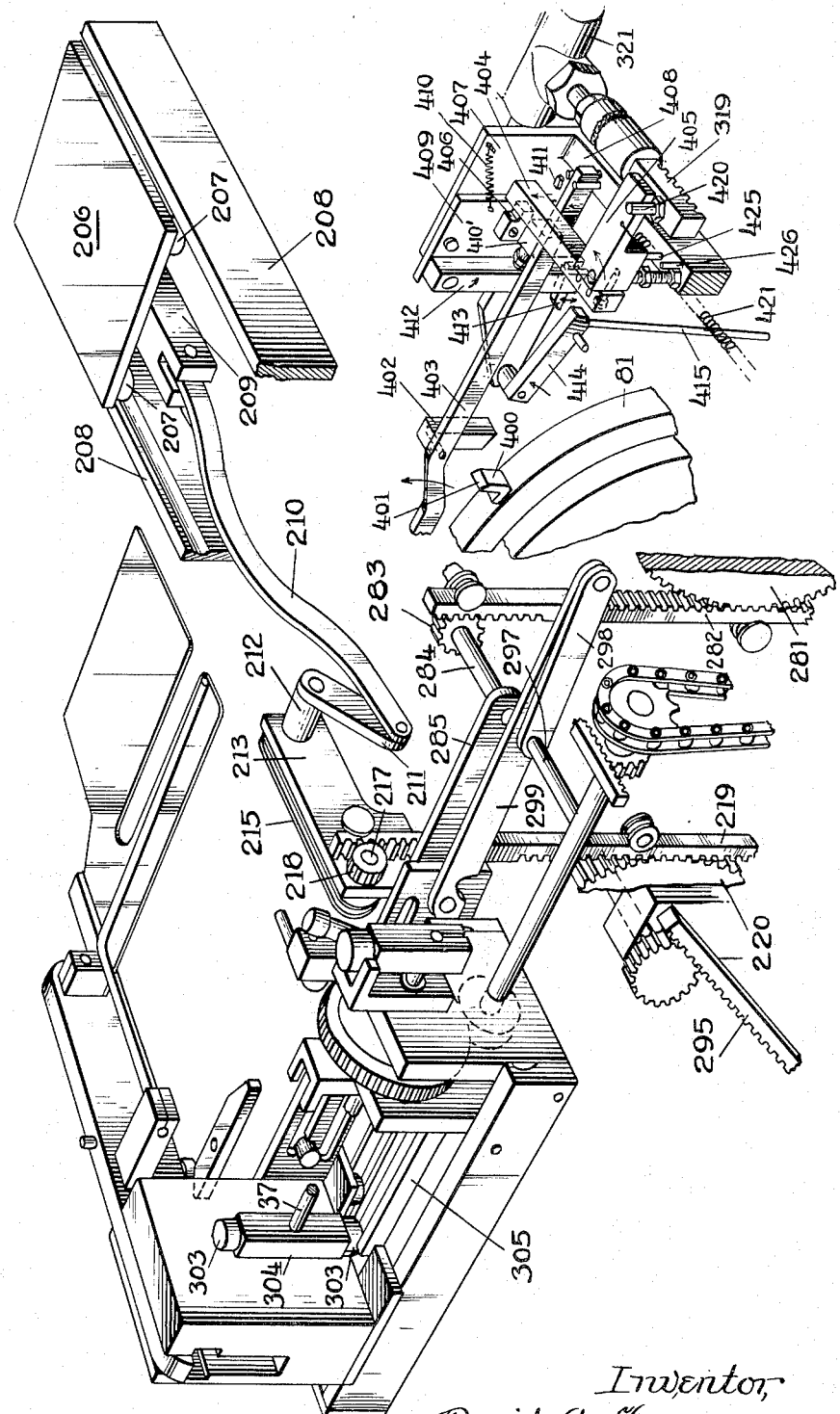
FIG. 17 is a diagrammatic, perspective view of the tail fold-up mechanism and drive thereof.

The forward and rearward movement of the entire tail clamping and lower side folding assembly is effected, as illustrated in FIGS. 2, 3 and 17, by the mounting of the assembly on a carriage 206 which is mounted on rollers 207 carried on a bed or guide ways 208 mounted on the frame at the tail end and extending longitudinally thereof. The carriage plate carries, on its under side, a bar 209 which is linked by a link 210 to a crank 211 secured to a crank shaft 212 journaled in a frame bracket 213 on the frame of the machine. The crank shaft 212 carries, at its other end, a sprocket 214 (see FIG. 2) which is connected by a chain 215 to a sprocket 216 connected by a shaft 217 to a pinion 218 that is engaged by a rack 219, which, in turn, engages a gear 220 journaled on the frame of the machine and power operated by carrying a crank arm 221 which, at its free end, is provided with a cam follower 222 that rides in the cam slot 223 of the tail folding cam wheel 81 (see FIG. 3).

By these means, when the rise in the cam slot 223 of the cam 81 on the main drive shaft 79, engages the follower 222, the gear 220 is rotated to raise the rack 219 which operates the chain and sprocket drive to rotate the crank shaft 212 for movement of the crank 211 and link 210 thereby effecting forward or rearward movement of the tail folding and clamping carriage 206.

Figure 15:
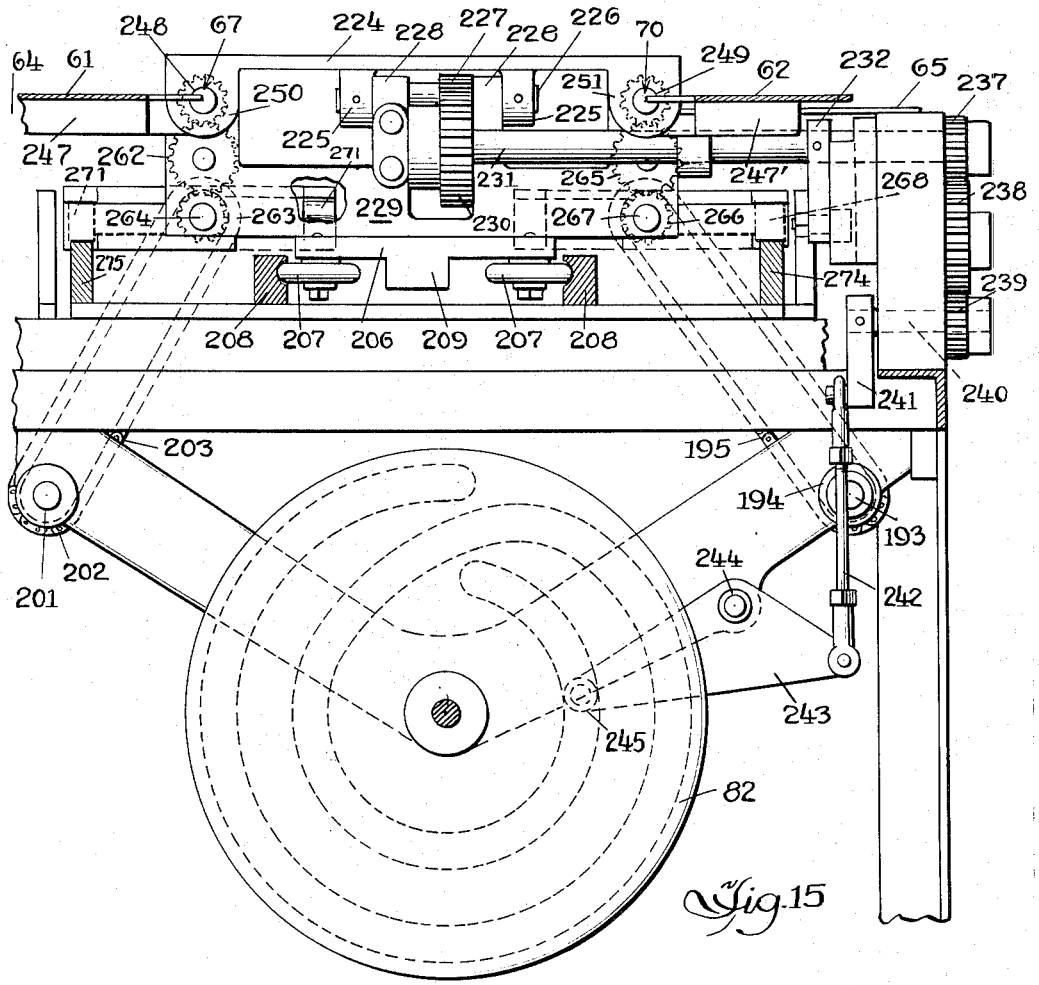
FIG. 15 is a transverse sectional view of the operating drive for the tail clamp and side folding mechanism, taken substantially along the line 15—15 of FIG. 1.

When the tail clamping and lower side folding arms are in position, at the limit of their movement toward the head end of the mechanism, the first operation performed thereby is the pivotal movement of the arms 61 and 62 to a position overlying the article to be folded and overlying the arms 64 and 65. This pivotal movement and the mounting which permits the pivotal movement is shown in FIGS. 15 and 16. With particular reference to FIGS. 1 and 15, it will be seen that the upper tail folding plates 61 and 62 are mounted on pivots 67 and 70 which are carried on a mounting plate 224. The plate 224 has a pair of depending ears 225 pivoted to a pivot shaft 226 forming the pivot axis 63. This shaft carries a gear 227 and is journaled in a pair of upstanding ears 228 on a mounting block 229 secured to the carriage plate 206 (see FIG. 15).

A second gear 230 is secured to a shaft 231 which is journaled in the ears 228 of the mounting block and extends to the right therefrom toward the right side of the machine where it carries a crank 232 (see FIG. 16).

When the tail clamping and lower side folding mechanism reaches its forwardmost position, a roller 233 carried on the crank arm 232 is engaged in a channel crank 234 carried on a pivot shaft 235 which is journaled in a mounting block 236. At its outer or right end, the pivot shaft 235 has secured thereon a gear 237 which is intermeshed with an idler gear 238 which, in turn, is meshed with a gear 239 carried on a pivot shaft 240 having a crank 241 secured on the inner end thereof. The crank 241 is linked by a connecting rod 242 to a cam follower crank 243 pivotally mounted on the frame at 244. The other arm of the crank 243 carries a cam follower 245 (FIGS. 15 and 16) which is engaged in the cam groove 246 of the third cam wheel 82.

When the rise in the cam wheel 82 engages the follower 245 (FIG. 16), the plate is pivoted outwardly so that the connecting rod 242 moves upwardly and thereby rotates the gears 239, 238 and 237 in an appropriate direction to move the channel crank 234 in a clockwise direction as viewed in FIG. 16. Through the gear and shaft connections, this movement of the channel crank 234 will cause the arm mounting plate 224 to move from the open position as shown therefor in FIG. 1 to a position wherein the plates 61 and 62 will overlie the arms 64 and 65, moving about the pivot axis 63.

Disposition of the folding arms 61 and 62 over the arms 64 and 65 with a garment clamped therebetween, places the mechanism in condition for the side folding operations described above to be effected. During the side folding operation, the arms 61 and 64 must move together from an outer position extending toward the left side of the machine to an inner position at the center of the machine folded about the pivot axes 67 and 68. These axes 67 and 68 are aligned, coaxially, when the amounting plate 224 is pivotally moved toward the head end of the machine and about the axis 63 (see FIG. 11). The pivotal mounting of the arms 61 and 62 is effected by securing the same on pivot brackets 247 and 247′, respectively, which are mounted on pivots 248 and 249, respectively, journaled in ears 250 and 251 on the plate 224. The height of the ears 250 and 251 is such that when the plate 224 is moved to its forward extending position, the axes 67 and 70 will be aligned with the axes 68 and 71, respectively.

The axes 68 and 71 are formed by pin journal ears 256 and 257 at the left and right sides of the machine, respectively, on the base block 229 mounted on the carriage plate 206 and extending upwardly therefrom. Pivot pins disposed in the ears 256 and 257 carry the mounting brackets 258 and 259 for the arm blades 64 and 65 and on which the arm blades are secured.

The arm pivot pins for the arms 64 and 65 also each carry a gear 260 and 261, respectively, for positive driving movement of the tail clamping and folding arms. It should be understood, of course, that when the arms 61 and 62 are overlying the arms 64 and 65, driving movement of the arm 64 will also drive the arm 61 and driving movement of the arm 65 will also drive the arm 62.

The driving movement of the arms 64 and 65 is effected through gear connections with the gears 260 and 261, as follows. The gear 260 is meshed with a gear 262 (see FIG. 15) journaled in the base block 229 and, in turn, intermeshed with a gear 263 mounted on a pivot shaft 264 which is journaled in the base block 229. Similarly, the gear 261 is meshed with an idler gear 265 which, in turn, meshes with the gear 266 carried on a pivot shaft 267 journaled in the block 229.

Figure 14:
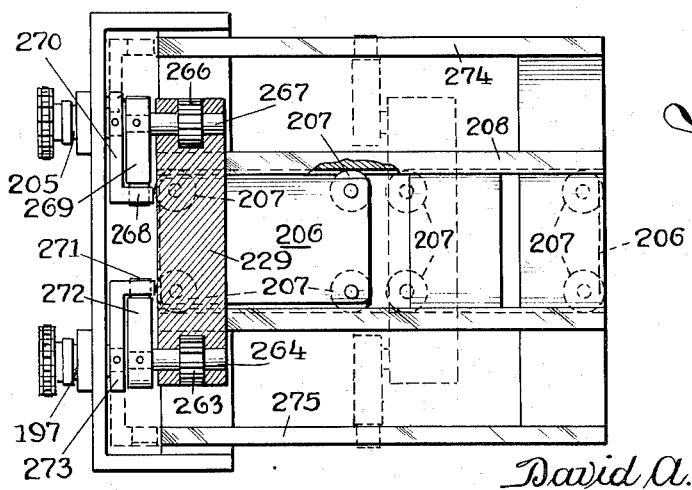
FIG. 14 is a fragmental sectional view taken substantially along the line 14—14 of FIG. 13.

As best seen in FIGS. 3, 14 and 16, when the tail clamping and lower side folding mechanism is in its forwardmost position, a roller 268 carried on a pivot lever 269 attached to the pivot shaft 267 is diposed between the arms of a bifurcated crank 270 carried on the shaft 205 which is journaled in a frame member. Similarly, at the left side of the machine (looking from the tail to the collar molding end of the machine) a roller 271 (see FIG. 15) carried on a crank 272 which is fixed to the pivot shaft 264 is received between the arms of a bifurcated crank 273 fixed on the shaft 197. In FIG. 14, these elements are shown in their inwardly disposed, open position in solid lines, and in their outwardly disposed, folded position and retracted position in dash lines.

The intermeshing of the rollers 268 and 271 with the cranks 270 and 273 completes a drive connection between the inner folding arms 49 and 50 at the head end of the table and the tail clamping and lower side folding arms at the tail end of the table for simultaneous movement along the left and right sides of the table, respectively. Thus, folding and unfolding of the left side and right side tail clamping and folding arms is effected through a controlled operation and rotation of the head end cam 80 and the mechanical linkages and drive connections from said cam to the several folding arms at each end of the table.

When the tail clamping and lower side folding mechanism is withdrawn to move to its outermost position at the tail end of the table, the driving connections between the crank 232 and the channel crank 234 for moving the arms 61 and 62 pivotally about the axis 63 and the driving action between the cranks 270 and 273 with the pivot cranks 269 and 272 are broken.

When the mechanism is in a withdrawn position and the arms are in a folded position, the tail clamping and folding arms are supported by the rollers 268 and 271 riding on rails 274 and 275 (see FIG. 15) at the right and left sides of the tail clamping and folding mechanism. Prior to rearward movement thereof but upon completion of the operation of the tail clamping and folding mechanism, as was described above in the early portions of this specification, the side fold-up mechanism 72 is moved inwardly of the machine from its outwardly extending right side position so as to fold the garment up toward the head end of the table. The tail clamping and lower side folding mechanism withdraws from the garment after the side fold-up mechanism has moved in but before it begins its folding movement.

The side fold-up mechanism is shown in detail in FIGS. 17–27 and FIGS. 1 and 2. The mechanism by which the tail fold-up mechanism is driven inwardly of the machine and then retracted outwardly after the fold-up operation is completed, is shown in detail in FIGS. 17, 21 and 22. This drive mechanism includes a combination cam drive from the cam wheel 81 shown in FIG. 2 and a pneumatic cylinder-piston drive. After the tail clamping and folding arms have been completely folded, the tail folding arms 73 and 74 are moved inwardly by operation of the tail folding cam where 81 acting through a follower 280 (FIG. 3) on a pinion 281 which meshes with a double-faced rack 282 engaged by a pinion 283 on a shaft 284 (FIG. 17) journaled in the frame of the machine. The other end of the shaft 284 is secured to a link 285 (FIGS. 17 and 21) that is pivotally connected to a second link 286 having roller 287 at the free end thereof and which rides in an upper slot 288 in a side plate 289 on the fold-up mechanism frame. The entire frame of the tail fold-up mechanism is movable laterally of the machine by being carried on rollers 290 (FIGS. 2, 20 and 24) that are disposed in guideway grooves 291 in side guide plates 292 on the main frame of the machine and extending laterally thereof (FIG. 2). When the linkages 285 and 286 are extended (FIG. 21), as when the cam follower 280 is in the first dwell position in the cam groove of the cam wheel 81, the roller 287 at the end of the link 286 seats in a pull notch 293 at the outer end of the slot 288.

As the cam follower is moved by the rise in the cam slot, however, the rack and pinion mechanism causes the shaft 284 to rotate in a clockwies direction as viewed in FIGS. 21 and 22 and in a counterclockwise direction as viewed in FIGS. 17 and 20, whereby the rollers 287 seating in the notch 293 pulls tail folding mechanism inwardly of the machine. The mechanism is then in condition for fold-up operations. These are described below following the discussion of the drive arrangement by which the mechanism is withdrawn from the folded garment and moved to an outwardly extended position at the right side of the machine.

The outward drive mechanism includes a piston and cylinder assembly 294 (see FIGS. 2, 17 and 21) mounted on the frame of the machine and having a rack 295 extending upwardly from the piston rod thereof and outwardly toward the left side of the machine. The rack 295 engages a pinion 296 secured to a shaft 297 journaled on the cam frame of the machine and having its other end secured to a link 298. The other end of the link 298 is pivotally connected to a second link 299 having a roller 300 at its free end and seated in a lower guide slot 301 in the side plate 289.

The tail fold-up mechanism is shown in its inwardly disposed position in FIG. 22. When it is in that position, a knob 302 lifts the roller 287 out of the notch 293. Then, when the piston and cylinder assembly 294 is actuated, the rack 295 will drive the pinion to rotate the shaft 297 and thereby cause the linkage to push against the end of the slot 301 thereby pushing the side plate 289 and the entire side fold-up mechanism to its outer position. Thereafter, the linkage 298 and 299 will return to the position shown in FIG. 21. And, still later, when the cam returns to its initial starting position as the follower 280 passes over the rise in the cam 81, the linkage 285 and 286 will return to the position shown in FIG. 21 with the roller 287 seated in the notch 293.

The transverse movement of the tail folding mechanism engages and disengages the drive for the fold-up operations of the mechanism. When the fold-up mechanism is moved to an inwardly disposed position for fold-up operations, the mechanism is held in its open, horizontal position by one of a pair of guide rollers 303 on a drive bar 304, the lowermost of the rollers 303 moving in a channel 305 (see FIG. 17) carried on a cross frame 306 between the side bars 292 of the fold-up mechanism frame. The drive bar 304 is mounted on a shaft 307 which operates as the drive shaft for the transverse mechanism and which, when held steady, as described above, holds the fold-up mechanism in a fixed position.

When the tail fold-up mechanism has moved to a fully inwardly disposed position, the upper of the rollers 303 engages in a bifurcated crank 308 which is secured to a sleeve 309 disposed about the shaft 307 and journaled in upstanding standards 310 on the cam frame. When in its most inwardly disposed position, a valve switch (not shown) is actuated to cause the piston and cylinder assembly 321 to drive the crank 308 in a counterclockwise direction (as viewed in FIG. 17) to perform the tail fold-up operation.

At the opposite side of the standards 310, a second bifurcated crank 311 is secured to the sleeve 309 and engageable with a drive bar 312 secured to the shaft 307 and carrying a roller 313 when the tail fold-up mechanism is disposed in its outermost position, as shown in FIGS. 2, 17 and 20.

In the tail folding operation, a gear 314 secured on the sleeve 309 between the standards 310 drives the cranks 308 and 311 and, in turn, is driven by a second gear 315 mounted on a shaft 316 which is journaled to the standards 310 and which extends beyond the left side of the machine where it is also journaled in a bearing bracket 317. Outwardly of the bracket 317, the shaft carries a pinion 318 which is engaged by a rack 319 connected to the piston rod 320 which is axially movable longitudinally of the machine in a piston and cylinder assembly 321. A sprocket and chain connection 322 also connects the shaft 316 to a speed regulator 323 (FIG. 2) to control the rate of operation of the side fold-up mechanism.

When the fold-up operation is completed, the mechanism is moved toward its outermost position and is held in that position by air pressure in the cylinder 294 until air pressure is released by a valve (not shown) actuated from the rack 282. In the retracted, or outermost, position, the roller 313 is engaged with the crank 311. And the return movement of the piston and cylinder assembly 321, caused by activation of a second valve switch (not shown), causes clockwise rotation of the crank to drive the fold-up mechanism to an unfolded position.

To insure against jamming of the machine by accidental activation of the foot pedal while the device is performing a folding operation, a novel safety has been incorporated into the machine. In the embodiment shown in FIG. 17, it is operatively coupled to the tail folding cam wheel 81 and the piston and cylinder assembly 321. It should be noted, however, that the safety may be incorporated with proper modification to other parts of the mechanism or even to mechanisms totally unrelated to garment folding machines.

Initially (before the tail fold-up operation), the piston 321 is in retracted condition, such as shown in FIG. 17. A lug 400 with an upper inclined edge 401, affixed to the periphery of cam wheel 81, initiates the safety by camming a cam lug 402 on the pivotable bar 403 affixed to the machine stand upwardly. This causes arm 404 of an L-shaped pivoted arm assembly to pivot upwardly over a step 406, integral with switch valve support plate 409. Plate 409 is pivoted to frame member 407.

The other arm 405 of the L-shaped pivoted arm assembly is pivoted to a forward extending lug 408 of the frame member 407. It is biased counterclockwise by the force of the piston assembly 321 through cam pin 420.

In raising arm 404 over the step 406, vertically disposed plate 409 is pivoted counterclockwise by force of spring 410 to bear against stop 411. In such a position, bar 412 pivoted to plate 409 with trip finger 413, is out of range of engagement with trigger 414, operatively connected to the foot pedal 16 by a link 415. Therefore, the foot pedal is ineffectual, at this stage, if it should be accidentally activated.

When piston assembly 321 begins its tail folding sequence by moving rack 319 forwardly, the cam pin 420 is likewise moved forwardly to release arm 405 so that spring 421 can pivot it clockwise. The clockwise pivotal movement of arm 405 pivots arm 404 clockwise to assume a position out from step 406—and down from step 406 due to its own weight and due to its tendency to align in the same plane as arm 405. Stop pins 425 and 426 limit movement of arm 405.

Upon return of the rack 319 during the unfolding sequence of the tail folding operation, cam pin 420, acting against the force of spring 421, pivots the L-shaped assembly counterclockwise. And, since the side of arm 404 is in facial position with the riser portion of step 406, arm 404 acts to pivot the step, the plate 409, the valve switch 410' for the master cylinder 83 and the pivoted bar 412 clockwise and to provide a back support for valve switch. This places trip finger 413 into range with trigger 414 of the foot pedal 16. Therefore, the foot pedal 16 is again effectual to cause activation of the mechanism.

The fold-up mechanism contained in the housing therefor is shown in detail in FIGS. 23–27. The drive shaft 307 is journaled in the housing 324 for the fold-up mechanism and therein carries a gear 325 which is meshed with an upper gear 326 carried on a shaft 327 journaled in the housing 324 above the saft 307. The shaft 327 also carries a pinion 328 which is engaged with a rack 329 extending longitudinally of the machine within a rack frame 330. Toward the tail end of the mechanism, the rack engages a pinion 331 which is journaled in the rack frame 330 on a shaft 332 extending inwardly of the machine and carrying the fold-up blade 73. A back-up roller 333 holds the rack 329 against the pinion 331 to maintain engagement therebetween. Similarly, a back-up roller 334 holds the rack 329 in engagement with the pinion 328. At its head end, the rack 329 carries a follower roller 335 and is held in a properly disposed, spaced position, by a roller 336 on the rack 329.

The upper fold-up arm 74 is carried on a crank 337 pivoted in the rack frame 330 at 338. At its opposite end, the crank 337 carries a cam follower 339 which rides on a cam 340 on the machine frame so that as the fold-up mechanism is moved inwardly, the upper fold-up arm 74 will be raised to clear the garment being folded by the mechanism. The depending arm of the crank 337 which carries the roller 339 also carries a pin 341, the other end of which is slidably disposed in a depending ear 342 on the rack 329. A spring 343 is disposed about the pin 341, and a release pin 344 carried on the upper arm of the crank 337, projects through a small aperture in the top of the rack frame.

Operationally, when the shaft 307 is driven by the crank 308 to perform a fold-up operation, the rack 329 is first driven to the right (FIG. 23) to move the pinion 331 in a counterclockwise direction and thereby rotate the lower fold-up arm 73 about the axis 332 of the pinion 331 to make the initial tail fold-up movement. During this operation, the guide rollers 335 move to the right, as viewed in FIG. 23, in guide channels 345 in the housing 324.

Continued movement of the shaft 307 causes the rollers 335 to move into an arcuate guide slot 346 in the housing 324 whereby the rack, rack frame and fold-up arms are all moved in a counterclockwise direction about the shaft 327, as viewed in FIGS. 23 and 25, until the fold-up operation is completed.

Unfolding of the fold-up arms is effected in a reverse manner when the roller 313 on the drive bar 312 is engaged in the crank 311. This causes reverse rotation of the pinion 328 and thereby reverses movement of the fold-up mechanism.

The operational procedure of the fold-up mechanism is shown diagrammatically in FIGS. 18, 19a, 19b, and 19c wherein it is seen that the first movement of the fold-up arms, by the tailward movement of the rack 329, causes the blade 73 to fold the forwardmost portion of a garmet (A) about the arm 74 from the position shown in FIG. 19a to the position shown in FIG. 19b. Then continued fold-up movement causes the entire mechanism to revolve about the axis of the pinion 328 so that the mechanism moves from the position shown in FIG. 19b to the position shown in FIG. 19c so that when the mechanism is in a fully folded position it appears as shown in FIG. 18.

When the mechanism reaches the fully folded position, a tail clamping mechanism, as shown in FIGS. 4, 5 and 9, is operated to clamp the garment in a folded position while the side folding mechanism is withdrawn through operation of the cylinder 294 carrying the rack 295. At its forward limit of movement, the tail fold-up mechanism engages a valve limit switch which permits air to flow to a cylinder and piston assembly 350 (FIG. 9) mounted on the cross bar 142 for the inner folding arms 49 and 50. An upstanding support block 351 on the cross bar 142 carries a pinion 352 engaged with the second pinion 353 on a pinion shaft 354 journaled in the block 351. Also carried on the shaft 354, is a lever 355 connected by a link 356 to a tail clamping arm assembly 357 which is also pivotally mounted on the cross bar 142.

The admission of air to the cylinder and piston assembly 350 causes the piston rod thereof to drive outwardly whereby the rack on the piston rod rotates the pinions 352 and 353 to rotate the lever 355 and thereby move the tail clamping arm assembly 357 downwardly from an upstanding position shown in FIG. 5 to a lower position as shown in FIG. 9.

It will be appreciated that some of the modifications and variations may be made without departing from the breadth and scope and novel concepts of this invention. One important modification which may be effected, and which forms a part of this invention, is the adjustability of the mechanism to handle various widths, lengths and thicknesses of material and articles to be folded. FIG. 28 illustrates an embodiment of this invention which shows adjustability and which incorporates all of the structure described hereinabove. In this connection, the mounting for the arms can be spread to handle different widths of articles by means of a double threaded screw rod mechanism. In FIG. 28, it is shown that a single knob 360 at the operator's side of the machine, is connected to a double threaded screw rod 361 which is threaded through the support blocks 362 and 363 for the several folding arms so that rotation of the knob in one direction will cause the arms to spread for wider folding and for folding a wider article. Rotation of the knob in the opposite direction will cause the arms to move closer together for narrower folding and for folding a narrower article.

A bevel gear 364 at the right end of the screw rod 361 is engageable with a bevel gear 365 at the head end of a counter shaft assembly 366. At its opposite end, the counter shaft 366 carries a bevel gear 367 which is intermeshed with a bevel gear 368 on a transversely extending double threaded screw rod 369 engaged through mounting blocks 370 and 371 for the tail clamping and side folding arms 61, 62, 64 and 65. Thus, the lateral width of the tail clamping and side folding mechanism will be synchronously adjusted with the lateral width of the head end folding arms by the operation of the single knob 360.

Adjustment for length in this embodiment of the invention is effected by operation of a second knob 372 on the side of the table at the operator's position. The knob is connected to a transverse operating shaft 373 which is split at 374 to accommodate lateral expansion of the mechanism. Adjacent its opposite ends, the shaft 373 carries bevel gears 375 and 376 which are meshed with bevel gears 377 and 378, respectively, on longitudinally extending screw rods 379 and 380, respectively. These screw rods are faced in thrust bearings 381 and 382, respectively, so that their longitudinal position with respect to the head end of the frame is fixed. Tailward of the thrust bearings 381 and 382, the screw rods 379 and 380 are engaged by nuts 383 and 384 which are fixed to the frame of the machine and to guide blocks 385 and 386 mounted on appropriate raceways so that rotation of the screw rod will cause longitudinal expansion and contraction of the table and the mechanism. A splined or keyed collar 387 connecting coaxial sections of the shaft 366 is further provided to permit the aforesaid longitudinal adjustment. Such adjustability permits the folding of articles of a wide variety of lengths and permits fold of the article to any desired packaging length. That is, the article may be of any length and the distance between the top of the article and the bottom fold therein may be any desired length.

Mechanisms embodying this invention inherently accommodate articles of a wide variety of weights and thicknesses by virtue of the resiliency of the parts, such as the various folding arms and levers, etc. In the arrangement of FIG. 28, however, extreme variations of this nature may be accommodated by adjustment of the vertical position of the tail clamping and side folding arms or blades 61 and 62 on their respective supports. Operation of adjusting screws 388 and 389 effects such vertical adjustment and thereby controls the spacing between the arms 61 and 64 and between the arms 62 and 65 when the mechanism is folded or closed.

It should be evident from the foregoing that the several mechanisms described as part of one folding machine herein may be used separately. For example, the top folding mechanism might be utilized in a semi-automatic machine wherein the tail end of the flexible material to be folded is manipulated by hand. Alternatively, the side or the tail folding mechanism might also be used in a semi-automatic machine or, for that matter, in an automatic machine in which other mechanisms are employed for the other parts of the machine.

It should be evident also that adjustability of the device may be effected in a number of different ways, all well within the scope of the instant invention. As an example, and without any intention of placing any limitation on the possibilities for modification within the scope of this invention, the effective length of the folding mechanism may be modified by mounting the collar molding mechanism of FIGS. 5 and 6 on slide rails at the head end of the table. Movement of the collar molding mechanism toward the head end of the table would effectively increase the length of the folding mechanism by providing a finished article which is folded longer. Similar adjustability techniques may be employed for other parts of the mechanism and within the scope of the invention.

From the description, it should also be obvious that the machine hereof and its several mechanisms can be used to fold any planar flexible material. For example, blankets or tablecloths or doilies can be automatically folded by proper adjustment of the top working surface to permit spanning of the edges.

From the foregoing, it will be readily observed that an entirely new method of automatic folding and entirely new concepts in automatic folding equipment constitutes the instant invention of which an illustrative embodiment has ben shown and described.

I claim:

1. A folding device for planar flexible material comprising a frame with a top working surface, a powered axle extending longitudinally with said frame, means for clamping one portion of said material to said top working surface, a series of folding arms pivotally connected to said top working surface, the arms of said series being operatively paired in a predetermined fashion to fold successive portions of said material inwardly, and means to successively operate said paired arms to fold said material to a smaller dimension, said means comprising a top, an intermediate and a tail-folding cam wheel affixed to said powdered axle, a series of cam followers actuated by said cam wheels and operatively connected to pivot mechanisms for pivoting individual folding arms, said cam followers being arranged so that said folding arms are pivoted successively to fold the unclamped portions of said material to a smaller dimension.

2. A folding device for planar flexible material comprising a frame with a top working surface, a powered axle extending longitudinally with said frame, means for clamping one portion of said material to said top working surface, a series of folding arms pivotally connected to said top working surface, the arms of said series being operatively paired in a predetermined fashion to fold successive portions of said material inwardly, and means to successively operate said paired arms to fold said material to a smaller dimension, said means comprising a top, an intermediate and a tail-folding cam wheel affixed to said powered axle, each said wheel having a cam slot therein for actuating a series of cam followers within said slot in each cam wheel, said cam followers being operatively connected to pivot means for pivoting said folding arms.

3. A folding device for planar flexible material comprising a frame with a top working surface, a powered axle extending longitudinally beneath said top working surface of said frame, means for clamping one portion of said material to said top working surface, a series of folding arms pivotally connected to said top working surface, the arms of said series being operatively paired in a predetermined fashion to fold successive portions of said material inwardly, and means to successively operate said paired arms to fold said material to a smaller dimension, said means comprising a top, an intermediate and a tail-folding cam wheel affixed to said powered axle, each said wheel having a convoluted cam slot therein for actuating a series of cam followers within said cam slot in each cam wheel, each said cam follower being affixed to one arm of a crank pivoted to said frame, the other arm of said crank being operatively connected to pivot means for pivoting said folding arms.

4. A folding device for planar flexible material comprising a frame with a top working surface, a powered axle extending longitudinally beneath said top working surface of said frame, means for clamping one portion of said material to said top working surface, a series of folding arms pivotally connected to said top working surface, the arms of said series being operatively paired in a predetermined fashion to fold successive portions of said material inwardly, and means to successively operate said paired arms to fold said material to a smaller dimension, said means comprising a top, an intermediate and a tail-folding cam wheel affixed to said powered axle, each said wheel having a convoluted cam slot with a rise portion therein for actuating a plurality of cam followers spaced from each other within said cam slot in each cam wheel, said cam followers being affixed to one arm of a crank pivoted to said frame, the other arm of said crank being pivoted to a tie rod operatively connected to a rack-pinion mechanism, said mechanism operating to pivot said folding arms as said cam wheel rotates to fold said flexible material to a smaller dimension.

5. A folding device for planar flexible material comprising a frame with a top working surface, a powered axle extending longitudinally with said frame, means for clamping one portion of said material to said top working surface, an outward extending series of top folding arms pivotally connected to said top working surface, said top folding arms being operated in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel actuating a plurality of cam followers, each operatively connected to a crank, and each crank operatively connected to a rack-pinion mechanism, each said mechanism successively pivoting a separate folding arm inwardly.

6. A folding device for planar flexible material comprising a frame with a top working surface, a powered axle extending longitudinally with said frame, means for clamping one portion of said material to said top working surface, an outward extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having a convoluted cam slot with a rise portion therein for actuating a plurality of cam followers spaced from each other within said slot, each cam follower operatively connected to one arm of separate crank means pivoted to said frame, the other arm of each crank means operatively connected to a rack-pinion mechanism, the pinion of each said mechanism acting to pivot one of said top folding arms through a universal joint assembly, said assembly being so constructed as to provide proper folding and unfolding movement of said folding arm.

7. A folding device for planar flexible material comprising a frame with a top working surface, a powered axle extending longitudinally with said frame, means for clamping one portion of said material to said top working surface, an outward extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle a series of cam followers actuated by said cam wheel and operatively connected to pivot mechanisms for individually pivoting the folding arms inwardly, and said top folding cam wheel having a convoluted cam slot with a rise portion therein for actuating a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint within said bearing block, operatively connecting one of said pinions and one of said top folding arms, said knuckle joint having guide means therein to control the rotational movement thereof so as to effect proper movement of the folding arm connected thereto.

8. A folding device for planar flexible material comprising a frame with atop working surface, a powered axle extending longitudinally with said frame, means for clamping one portion of said material to said top working surface, an outward extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly and said top folding cam wheel having a convoluted cam slot with a rise portion therein for actuating a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint formed of a bifurcated joint block within a bearing block, a knuckle pin extending across the arms of said bifurcated joint block, and a pivot block pivoted to said knuckle pin within said arms, said joint block being operatively connected to said pinion and said pivot block being operatively connected to one of said top folding arms, and said knuckle joint having guide means therein to control the rotational movement of the knuckle pin members so as to effect proper movement of the folding arm connected thereto.

9. A folding device for planar flexible material comprising a frame with a top working surface, a powered axle extending longitudinally with said frame, means for clamping one portion of said material to said top working surface, an outward extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having a convoluted cam slot with a rise portion therein for actuating a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint formed of a bifurcated joint block within a bearing block, a knuckle pin extending across the arms of said bifurcated joint block, and a pivot block pivoted to said knuckle pin within said arms, said joint block being operatively connected to said pinion and said pivot block being operatively connected to one of said top folding arms, said knuckle joint having a guide member operative within a guide slot in the bearing block, said guide slot having a cutaway section, said slot with said cutaway section acting to control the rotational movement of the knuckle pin members so as to effect proper movement of the folding arm connected thereto.

10. A folding device for planar flexible material comprising a frame with a top working surface, a powered axle extending longitudinally with said frame, means for clamping one portion of said material to said top working surface, an outwardly extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having a convoluted cam slot with a rise portion therein for actuatting a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint within said bearing block, operatively connecting one of said pinions and one of said top folding arms, said knuckle joint having guide means therein to control the rotational movement thereof so as to effect proper movement of the folding arm connected thereto, the guide means for two of said universal joints operatively connected to said top folding arms having a structure permitting vertical pivotal movement at all times and horizontal pivotal movement only when said arms are planar to said top working surface.

11. A folding device for planar flexible material comprising a frame with a top working surface, a powered axle extending longitudinally with said frame, means for clamping one portion of said material to said top working surface, an outwardly extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having convoluted cam slot with a rise portion therein for actuating a plurality of cam followerers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint formed of a bifurcated joint block within a bearing block, a knuckle pin extending across the arms of said bifurcated joint block, and a pivot block pivoted to said knuckle pin within said arms, said joint block being operatively connected to said pinion and said pivot block being operatively connected to one of said top folding arms, and said knuckle joint having guide means therein to control the rotational movement of the knuckle pin members so as to effect proper movement of the folding arm connected thereto, the guide means for two of said universal joints operatively connected to said top folding arms having a structure permitting vertical pivotal movement at all times and horizontal pivotal movement only when said arms are planar to said top working surface.

12. A folding device for planar flexible material comprising a frame with a top working surface, a powered axle extending longitudinally with said frame, means for clamping one portion of said material to said top working surface, an outwardly extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having a convoluted cam slot with a rise portion therein for actuating a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint formed of a bifurcated joint block within a bearing block, a knuckle pin extending across the arms of said bifurcated joint block, and a pivot block pivoted to said knuckle pin within said arms, said joint block being operatively connected to said pinion and said pivot block being operatively connected to one of said top folding arms, said knuckle joint having a guide member operative within a guide slot in the bearing block, said guide slot having a cutaway section, said slot with said cutaway section acting to control the rotational movement of the knuckle pin members so as to effect proper movement of the folding arm connected thereto, the slot for said guide means being vertically and perpendicularly disposed to a longitudinal parallel line to said top working surface and said cutaway section being so formed in the bearing block to permit inward folding and outward unfolding of folding arms operatively connected to said universal joints.

13. A folding device for planar flexible material comprising a frame with a top working surface, a powered axle extending longitudinally with said frame, means for clamping one portion of said material to said top working surface, an outwardly extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having a convoluted cam slot with a rise portion therein for actuating a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint formed of a bifurcated joint block within a bearing block, a knuckle pin extending across the arms of said bifurcated joint block, and a pivot block pivoted to said knuckle pin within said arms, said joint block being operatively connected to said pinion and said pivot block being operatively connected to one of sad top folding arms, said knuckle joint having a guide member operative within a guide slot in the bearing block, said guide slot having a cutaway section, said slot with said cutaway section acting to control the rotational movement of the knuckle pin members so as to effect proper movement of the folding arm connected thereto, the slot for said guide means being vertically and perpendicularly disposed to a longitudinal parallel line to said top working surface and said cutaway section being so formed in the bearing block to permit inward folding and outward unfolding of folding arms operatively connected to said universal joints, and two of said universal assemblies having means between their pivot blocks and their operatively connected top folding arms to cause a pivotal arc sliding movement of two of said top folding arms over the side edge of said top surface to effect an initial outer fold on said flexible material.

14. A folding device for planar flexible material comprising a frame with a top working surface. A powered axle extending longitudinally with said frame, means for clamping one portion of said material to said top working surface, an outwardly extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having a convoluted cam slot with a rise portion therein for actuating a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint formed of a bifurcated joint block within a bearing block, a knuckle pin extending across the arms of said bifurcated joint block, and a pivot block pivoted to said knuckle pin within said arms, said joint block being operatively connected to said pinion and said pivot block being operatively connected to one of said top folding arms, said knuckle joint having a guide member operative within a guide slot in the bearing block, said guide slot having a cutaway section, said slot with said cutaway section acting to control the rotational movement of the knuckle pin members so as to effect proper movement of the folding arm connected thereto, the slot for said guide means being vertically and perpendicularly disposed to a longitudinal parallel line to said top working surface and said cutaway section being so formed in the bearing block to permit inward folding and outward unfolding of folding arms operatively connected to said universal joints, and two of said universal assemblies having means between their pivot blocks and their operatively connected top folding arms to cause a pivotal arc sliding movement of two of said top folding arms over the side edge of said top surface to effect an initial outer fold on said flexible material, and restraining means for the outer portion of said material as said two folding arms move over the edges of said top working surface.

15. A folding device for planar flexible material comprising a frame with a top working surface, a powered axle extending longitudinally with said frame, means for clamping one portion of said material to said top working surface, an outwardly extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having a convoluted cam slot with a rise portion therein for actuating a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint formed of a bifurcated joint block within a bearing block, a knuckle pin extending across the arms of said bifurcated joint block, and a pivot block pivoted to said knuckle pin within said arms, said joint block being operatively connected to said pinion and said pivot block being operatively connected to one of said top folding arms, said knuckle joint having a guide member operative within a slot in the bearing block, said guide slot having a cutaway section, said slot with said cutaway section acting to control the rotational movement of the knuckle pin members so as to effect proper movement of the folding arm connected thereto, the slot for said guide means being vertically and perpendicularly disposed to a longitudinal parallel line to said top working surface and said cutaway section being so formed in the bearing block to permit inward folding and outward unfolding of folding arms operatively connected to said universal joints, and two of said universal assemblies having means between their pivot blocks and their operatively connected top folding arms to cause a pivotal arc sliding movement of two of said top folding arms over the side edge of said top surface to effect an initial outer fold on said flexible material, and restraining means for the outer portion of said material as said two folding arms move over the edges of said top working surface, said restraining means comprising a bar in planar parallel relationship to the edge of said top working surface and pivotal about a horizontally disposed transverse axis to said top working surface.

16. A folding device for planar flexible material comprising a frame with a top working surface, a powered axle extending longitudinally with said frame, means for clamping one portion of said material to said top working surface, an outwardly extending series of top folding arms pivotally connected to said top working surface, said top folding arms being operated successively in predetermined fashion to fold the top of said material inwardly, and means to successively operate said arms to fold same material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having a convoluted cam slot with a rise portion therein for actuating a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint formed of a bifurcated joint block within a bearing block, a knuckle pin extending across the arms of said bifurcated joint block, and a pivot block pivoted to said knuckle pin within said arms, said joint block being operatively connected to said pinion and said pivot block being operatively connected to one of said top folding arms, said knuckle joint having a guide member operative within a guide slot in the bearing block, said guide slot having a cutaway section, said slot with said cutaway section acting to control the rotational movement of the knuckle pin members so as to effect proper movement of the folding arm connected thereto, the slot for said guide means being vertically and perpendicularly disposed to a longitudinal parallel line to said top working surface and said cutaway section being so formed in the bearing block to permit inward folding and outward unfolding of folding arms operatively connected to said universal joints, and two of said universal assemblies having means between their pivot blocks and their operatively connected top folding arms to cause a pivotal arc sliding movement of two of said top folding arms over the side edge of said top surface to effect an initial outer fold on said flexible material, and the means of one of said two universal assemblies comprising an outwardly extending arm and a biased pivotal connection between said arm and the top folding arm operatively connected to said universal assembly, said biased pivotal connection biasing said arm against the side and top working surface of said frame.

17. A folding device for planar flexible material comprising a frame with a top working surface, a powered axle extending longitudinally with said frame, means for clamping one portion of said material to said top working surface, an outward extending series of top folding arms pivotally connected to said top working surface, said top folding arms being operated successively in predetermined fashion to fold the top of said material inwardly, and means to successively operate said arms to fold said material to a smaller dimension, said means comprising a top folding cam wheel affixed to said powered axle, a series of cam followers actuated by said cam wheel and operatively connected to pivot mechanisms for individually pivoting the folding arms inwardly, and said top folding cam wheel having a convoluted cam slot with a rise portion therein for actuating a plurality of cam followers spaced from each other within said slot, each cam follower operatively connected to one arm of separate crank means pivoted to said frame, the other arm of each crank operatively connected to a rack-pinion mechanism, the pinion of each mechanism acting to pivot one of said top folding arms through a universal joint assembly, said assembly comprising a bearing block affixed to said frame, a knuckle joint formed of a bifurcated joint block within a bearing block, a knuckle pin extending across the arms of said bifurcated joint block, and a pivot block pivoted to said knuckle pin within said arms, said joint block being operatively connected to said pinion and said pivot block being operatively connected to one of said top folding arms, said knuckle joint having a guide member operative within a guide slot in the bearing block, said guide slot having a cutaway section, said slot with said cutaway section acting to control the rotational movement of the knuckle pin members so as to effect proper movement of the folding arm connected thereto, the slot for said guide means being vertically and perpendicularly disposed to a longitudinal parallel line to said top working surface and said cutaway section being so formed in the bearing block to permit inward folding and outward unfolding of folding arms operatively connected to said universal joints, and two of said universal assemblies having means between their pivot blocks and their operatively connected top folding arms to cause a pivotal arc sliding movement of two of said top folding arms over the side edge of said top surface to effect an initial outer fold on said flexible material, and the means of one of said two universal assemblies comprising a cammed vertically rotatable arm transversely disposed with respect to said frame and means thereon to pivot one of said top folding arms over the side edge of said top working surface in an arc movement.

18. The device of claim 17 wherein the means to pivot said one of the top folding arms comprises a rack on said arm and an engaging pinion operatively coupled to said folding arm.

19. The device of claim 18 wherein the engaging pinion is affixed to a rotatable axle bar longitudinally disposed with respect to said top working surface and said axle bar is directly coupled to a folding pattern bar so as to swing said pattern bar in horizontal fashion over a portion of the top working surface, and is operatively connected to one of said folding arms.

20. A folding device for flexible material comprising a power means, a frame with a top working surface, means for clamping one portion of said material to said top working surface, a series of folding arms pivotally mounted to said top working surface, means to successively operate opposing folding arms to fold the other portions of said material, and safety means comprising a valve switch for said power means reversibly movable by said means to successively operate said folding arms into and out of engagement with a valve switch actuating means.

21. A folding device for flexible material comprising a power means, a frame with a top working surface, means for clamping one portion of said material to said top working surface, a series of folding arms pivotally mounted to said top working surface, means to successively operate opposing folding arms to fold the other portions of said material, and safety means comprising a valve switch for said power means mounted upon a pivotable support member reversibly movable by said means to successively operate said folding arms into and out of engagement with a valve switch actuating means.

22. A knuckle joint consisting of a bearing block, a bifurcated joint block member within said bearing block, a knuckle pin extending across the arms of said bifurcated joint block member, a pivot block member pivoted to said knuckle pin within said arms and guide means within said bearing block to control the movement of said two members.

23. A folding device as described in claim 1 wherein there is provided means for clamping and folding one end portion of said material on said working surface, said means including a plurality of pivotal folding arms, and means to adjust the spatial relation of said arms to accommodate various thicknesses of material.

24. A folding device as described in claim 7 wherein the top working surface is plural membered and there is provided means for effecting reversible width and length adjustment of the plural-membered top working surface comprising at least one main adjustment shaft, at least one perpendicularly disposed secondary shaft operatively connected to said main adjustment shaft, one member of said plural-membered top working surface being affixed to said main and secondary shafts and moveable thereby, and means to effect movement of said shafts and thereby movement of said members.

25. A folding device as described in claim 7 wherein the top working surface is plural membered and there is provided means for effecting reversible width and length adjustment of the plural-membered top working surface comprising at least one main adjustment threaded shaft, a bevel gear on the end of said shaft, at least one perpendicularly disposed secondary threaded shaft with a bevel gear operatively connected to said bevel gear of said main shaft, one member of said plural-membered top working surface being affixed to said main and secondary shafts through threaded journals affixed thereto, and means to effect movement of said members through said shafts.

26. A folding device for planar but irregularly shaped flexible material such as long and short-sleeved shirts, blouses, sweaters and the like, comprising a frame with a top working surface, a powered axle extending longitudinally with said frame, means for clamping one portion of said material to said top working surface, a series of top folding, tail clamping and lower side folding, and tail folding arms, pivotally connected to said top working surface, said folding arms being operated successively in predetermined fashion to fold the top, the side and the tail of said material inwardly, and power means to successively operate said arms to fold said material to a smaller dimension, said means comprising a plurality of cam wheels having convoluted cam slots with rise portions therein affixed to said powered axle said cam slots actuating a series of cam followers spaced from each other within said slots, each cam follower operatively connected to pivot mechanisms for individually pivoting the folding arms inwardly, the cam followers connected to the top folding arms operatively connected to one arm of separate crank means pivoted to said frame, the other arm of each crank means operatively connected to a rack-pinion mechanism, the pinion of each said mechanism acting to pivot one of each of said top folding arms through a universal joint assembly, said assembly being so constructed as to provide proper folding and unfolding movement of said top folding arms, and the cam followers operatively connected to the tail clamping and side folding arms being operatively connected to one arm of cranks pivoted to said frame, the other arm of each of said cranks being pivoted to a tie rod operatively connected to a second crank, said second crank coupled to a gear train which powers a disengageable channel crank capable of acting, through its channel, upon a third crank operatively connected through a gear train to a pivot mounted upon a reciprocating end portion of said working surface to which said series of tail clamping and side folding arms are pivoted, said pivot having an axis transverse to said top working surface, and said reciprocating end portion of said working surface being longitudinally movable by the action of one of said cam wheels, and the cam followers operatively connected to the tail folding arms being operatively connected to crank means, said crank means operatively connected to a rack-pinion mechanism, and said rack-pinion mechanism operatively connected to a second crank means pivoted to a transversely movable tail folding means for said tail folding arms, said tail folding means comprising a piston and cylinder assembly operatively connected to a gear train, said gear train operating a rack-pinion mechanism to which a tail folding arm is affixed to cause folding of the tail of said flexible material, and safety means comprising a valve switch for said power means, said switch being reversibly movable by said tail folding means into and out of engagement with the actuating means for said valve switch.

References Cited by the Examiner

UNITED STATES PATENTS

| | | | |
|---|---|---|---|
| 302,558 | 7/1884 | Gale | 270—61 |
| 545,085 | 8/1895 | Mannesmann | 64—6 |
| 745,115 | 11/1903 | Petersen | 108—65 |
| 797,267 | 8/1905 | Crutchlow | 64—6 X |
| 1,047,811 | 12/1912 | Hudson | 64—7 |
| 1,096,633 | 5/1914 | Labombarde | 93—52 |
| 1,390,301 | 9/1921 | McManis et al. | 128—74 |
| 2,099,700 | 11/1937 | Martis | 53—388 |
| 2,222,101 | 11/1940 | Johnson | 192—129.2 |
| 2,307,383 | 1/1943 | Boynton et al. | 192—129.2 |
| 2,370,125 | 2/1945 | Cronin | 223—37 X |
| 2,508,108 | 5/1950 | Gayring et al. | 223—37 |
| 2,577,177 | 12/1951 | Anderson | 269—322 |
| 2,616,594 | 11/1952 | Calder et al. | 223—37 |
| 2,654,234 | 10/1953 | Christensen | 64—6 |
| 2,680,612 | 6/1954 | Hubelmeyer | 270—61 |
| 2,687,832 | 8/1954 | Westwood | 223—37 |
| 2,701,715 | 2/1955 | Gibney | 270—80 |
| 2,709,080 | 5/1955 | Gilchrist | 270—84 |
| 2,768,774 | 10/1956 | Rieck | 223—52.1 |
| 2,921,726 | 1/1960 | Maxwell et al. | 223—37 |
| 2,931,545 | 4/1960 | Renick | 223—52.1 |
| 2,950,848 | 8/1960 | Gayring | 223—37 |
| 2,954,908 | 10/1960 | Plehal | 223—37 |
| 3,133,732 | 5/1964 | Beamish et al. | 270—61 |

FOREIGN PATENTS 835,289   5/1960   Great Britain.

JORDAN FRANKLIN, *Primary Examiner.*

DAVID WILLIAMOWSKY, THOMAS J. HICKEY, *Examiners.*

G. V. LARKIN, P. L. GARDNER, *Assistant Examiners.*